US008583067B2

(12) United States Patent
Budampatl et al.

(10) Patent No.: US 8,583,067 B2
(45) Date of Patent: Nov. 12, 2013

(54) APPARATUS AND METHOD FOR IMPROVED WIRELESS COMMUNICATION RELIABILITY AND PERFORMANCE IN PROCESS CONTROL SYSTEMS

(75) Inventors: Ramakrishna S. Budampatl, Maple Grove, MN (US); Arun V. Mahasenan, Trivandrum (IN); SrinivasaRao Katuri, Bangalore (IN); Sharath Babu Malve, Warangal (IN); Guhapriyan Thanikachalam, Dharmapuri (IN)

(73) Assignee: Honeywell International Inc., Morristown, NJ (US)

( * ) Notice: Subject to any disclaimer, the term of this patent is extended or adjusted under 35 U.S.C. 154(b) by 737 days.

(21) Appl. No.: 12/561,136

(22) Filed: Sep. 16, 2009

(65) Prior Publication Data
US 2010/0075611 A1    Mar. 25, 2010

Related U.S. Application Data

(60) Provisional application No. 61/099,729, filed on Sep. 24, 2008.

(51) Int. Cl.
*H04B 1/06* (2006.01)
*H04B 7/00* (2006.01)

(52) U.S. Cl.
USPC ............. 455/272; 455/273; 455/101; 455/74; 455/41.1; 455/41.2; 455/41.3

(58) Field of Classification Search
USPC ......... 455/272, 273, 101, 74, 41.1, 41.2, 41.3
See application file for complete search history.

(56) References Cited

U.S. PATENT DOCUMENTS

| 5,155,741 | A  | * | 10/1992 | Waters et al. ................. 375/142 |
| 5,550,505 | A  |   | 8/1996  | Gaus, Jr. |
| 6,373,899 | B1 |   | 4/2002  | Krasner |
| 6,909,760 | B2 |   | 6/2005  | Borowski et al. |
| 6,912,261 | B2 | * | 6/2005  | Aslanis et al. ................. 375/364 |
| 7,039,243 | B2 | * | 5/2006  | Scheirer et al. ............... 382/232 |
| 7,158,542 | B1 |   | 1/2007  | Zeng et al. |
| 2003/0169711 | A1 | | 9/2003  | Borowski et al. |

(Continued)

FOREIGN PATENT DOCUMENTS

KR    1020080031348    4/2008
WO    WO 2004/049652 A1   6/2004

OTHER PUBLICATIONS

M.A. Do, et al., "Hybrid diversity combining techniques for DS-CDMA over a multipath fading channel", Wireless Networks 3 (1997), pp. 155-158.

(Continued)

*Primary Examiner* — Wen Huang

(57) ABSTRACT

An apparatus includes a transceiver configured to transmit wireless signals to and receive wireless signals from wireless nodes associated with an industrial process. The apparatus also includes a controller configured to initiate transmission of the wireless signals and to process data contained in the received wireless signals. The transceiver includes a diversity receiver configured to process the wireless signals from the wireless nodes. The transceiver may be further configured to perform beam-shaping in order to transmit a directional beam to at least one of the wireless nodes. Also, the controller may be configured to perform spatial routing by identifying a target of a wireless transmission and to initiate transmission of the directional beam towards a known or estimated location associated with the identified target.

20 Claims, 22 Drawing Sheets

(56) References Cited

U.S. PATENT DOCUMENTS

| | | | |
|---|---|---|---|
| 2005/0037799 A1* | 2/2005 | Braun et al. | 455/525 |
| 2006/0087423 A1* | 4/2006 | Coronel et al. | 340/539.1 |
| 2006/0105716 A1* | 5/2006 | Jung et al. | 455/63.1 |
| 2007/0249404 A1* | 10/2007 | Gao et al. | 455/562.1 |
| 2008/0096509 A1 | 4/2008 | Ling | |
| 2009/0089851 A1* | 4/2009 | Guo et al. | 725/125 |
| 2010/0067602 A1* | 3/2010 | Noel et al. | 375/267 |
| 2010/0081392 A1* | 4/2010 | Rousseau | 455/67.14 |

OTHER PUBLICATIONS

M. Oguz Sunay, et al., "Diversity Combining for DS CDMA Systems with Synchronization Errors", 1996 IEEE, pp. 83-89.

Deepti Singh, et al., "Analysis of Rake Reception with MRC and Imperfect Weight Estimation for Binary Coherent Orthogonal Signaling", 5 pages.

Ning Kong, et al., "A Selection Combining Scheme for Rake Receivers", 1995 IEEE, pp. 426-430.

S.A. Allpress, et al., "A Comparison of Maximal Ratio and Equal Gain Diversity Combining in Direct Sequence CDMA Future Mobile Communication Networks", Apr.-Dec. 1990, 5 pages.

Ozgur Ertug, "On the Impact of Diversity Combining Schemes to the Performance of RAKE Receivers over GWSSUS Fading Channels", 4 pages.

Mohamed-Slim Alouini, et al., "RAKE Reception with Maximal-Ratio and Equal-Gain Combining for DS-CDMA Systems in Nakagami Fading", 5 pages.

Kiran Gunnam, et al., "A Low Power Preamble Detection Methodology for Packet Based Modems", TAMU-ECE-2006, (2006), 5 pages.

"FSK Modulation and Demodulation With the MSP430 Microcontroller", Application Report, Texas Instruments, Dec. 1998, 34 pages.

Ramakrishna S. Budampati, et al., "Apparatus and Method for Hybrid Diversity Combining and Adaptive Beam Forming in Industrial Control and Automation Systems", U.S. Appl. No. 12/471,177, filed May 22, 2009.

* cited by examiner

APPARATUS AND METHOD FOR IMPROVED WIRELESS COMMUNICATION RELIABILITY AND PERFORMANCE IN PROCESS CONTROL SYSTEMS

CROSS-REFERENCE TO RELATED APPLICATIONS

This application claims priority under 35 U.S.C. §119(e) to U.S. Provisional Application No. 61/099,729 filed on Sep. 24, 2008, which is hereby incorporated by reference.

TECHNICAL FIELD

This disclosure relates generally to process control systems. More specifically, this disclosure relates to an apparatus and method for improved wireless communication reliability and performance in process control systems.

BACKGROUND

In industrial automation and control applications, sensor networks have been widely deployed to support sensing, monitoring, and control of various process variables through wireless communications. Ideally, wireless communication links perform as well as wired communication links. In reality, however, wireless communications suffer from a number of problems in industrial facilities. For example, wireless communications in industrial facilities are often limited by severe fading due to a wide variety of obstacles, such as plant structures, giant machines, and the mobility of humans. To achieve adequate communication reliability and performance for process control systems, it is often necessary to deploy more sensor networks or network components in a given area. This typically increases the cost and complexity of the overall system.

SUMMARY

This disclosure provides an apparatus and method for improved wireless communication reliability and performance in process control systems.

In a first embodiment, a system includes a wireless sensor configured to measure one or more characteristics associated with an industrial process. The system also includes a wireless node configured to receive wireless signals containing sensor measurements from the wireless sensor. The wireless node includes a diversity receiver configured to process the wireless signals from the wireless sensor.

In a second embodiment, an apparatus includes a transceiver configured to transmit wireless signals to and receive wireless signals from wireless nodes associated with an industrial process. The apparatus also includes a controller configured to initiate transmission of the wireless signals and to process data contained in the received wireless signals. The transceiver includes a diversity receiver configured to process the wireless signals from the wireless nodes.

In a third embodiment, a method includes receiving a wireless signal from a wireless sensor associated with an industrial process. The method also includes processing the wireless signal using diversity combining to extract a sensor measurement from the wireless signal.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 20B, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
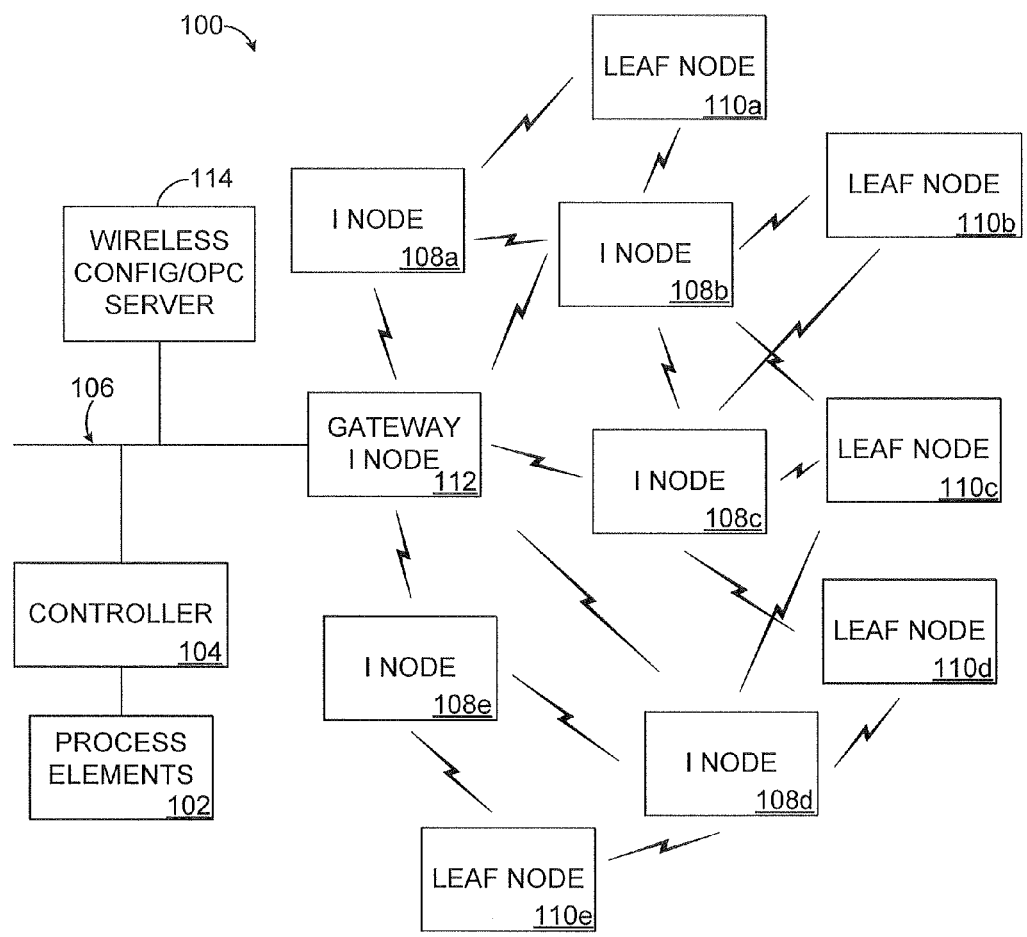
FIG. 1 illustrates an example industrial control and automation system according to this disclosure.

FIG. 1 illustrates an example industrial control and automation system 100 according to this disclosure. In this example embodiment, the system 100 includes one or more process elements 102. The process elements 102 represent components in a process system that perform any of a wide variety of functions. For example, the process elements 102 could represent sensors, actuators, or any other or additional industrial equipment in a processing environment. Each process element 102 includes any suitable structure for performing one or more functions in a process system. Also, a process system may represent any system or portion thereof configured to process one or more materials in some manner.

A controller 104 is coupled to the process elements 102. The controller 104 controls the operation of one or more of the process elements 102. For example, the controller 104 could receive information associated with the process system, such as sensor measurements from some of the process elements 102. The controller 104 could use this information to provide control signals to others of the process elements 102, thereby adjusting the operation of those process elements 102. The controller 104 includes any hardware, software, firmware, or combination thereof for controlling one or more process elements 102. The controller 104 could, for example, represent a computing device executing a MICROSOFT WINDOWS operating system.

A network 106 facilitates communication between various components in the system 100. For example, the network 106 may communicate Internet Protocol (IP) packets, frame relay frames, Asynchronous Transfer Mode (ATM) cells, or other suitable information between network addresses. The network 106 may include one or more local area networks, metropolitan area networks, wide area networks (WANs), all or a portion of a global network, or any other communication system or systems at one or more locations.

In FIG. 1, the process control system 100 also includes one or more wireless networks for communicating with wireless sensors or other devices. In this example, a wireless network includes infrastructure nodes ("I nodes") 108a-108e, leaf nodes 110a-110e, and a gateway infrastructure node 112.

The infrastructure nodes 108a-108e and the leaf nodes 110a-110e engage in wireless communications with each other. For example, the infrastructure nodes 108a-108e may receive data transmitted over the network 106 (via the node 112) and wirelessly communicate the data to the leaf nodes 110a-110e. Similarly, the leaf nodes 110a-110e may wirelessly communicate data to the infrastructure nodes 108a-108e for forwarding to the network 106 (via the node 112). In addition, the infrastructure nodes 108a-108e may wirelessly exchange data with one another. In this way, the infrastructure nodes form a wireless network capable of providing wireless coverage to leaf nodes and other devices in a specified area, such as a large industrial complex.

In this example, the nodes 108a-108e and 110a-110e are divided into infrastructure nodes and leaf nodes. The infrastructure nodes 108a-108e typically represent routing devices that can store and forward messages for other devices. Infrastructure nodes 108a-108e are typically line-powered devices, meaning these nodes receive operating power from an external source. Infrastructure nodes 108a-108e are typically not limited in their operations since they need not minimize power consumption to increase the operational life of their internal power supplies. On the other hand, the leaf nodes 110a-110e are generally non-routing devices that do not store and forward messages for other devices (although they could do so). Leaf nodes 110a-110e typically represent devices powered by local power supplies, such as nodes that receive operating power from internal batteries or other internal power supplies. Leaf nodes 110a-110e are often more limited in their operations in order to help preserve the operational life of their internal power supplies.

The nodes 108a-108e and 110a-110e include any suitable structures facilitating wireless communications, such as radio frequency (RF) transceivers. The nodes 108a-108e and 110a-110e could also include other functionality, such as functionality for generating or using data communicated over the wireless network. For example, the leaf nodes 110a-110e could represent wireless sensors used to measure various characteristics within an industrial facility. The sensors could collect and communicate sensor readings to the controller 104 via the gateway infrastructure node 112. The leaf nodes 110a-110e could also represent actuators that receive control signals from the controller 104 and adjust the operation of the industrial facility. In this way, the leaf nodes may include or operate in a similar manner as the process elements 102 physically connected to the controller 104. The leaf nodes 110a-110e could further represent handheld user devices (such as INTELATRAC devices from HONEYWELL INTERNATIONAL INC.), mobile stations, programmable logic controllers, or any other or additional devices. The infrastructure nodes 108a-108e may also include any of the functionality of the leaf nodes 110a-110e or the controller 104.

The gateway infrastructure node 112 communicates wirelessly with, transmits data to, and receives data from one or more infrastructure nodes and possibly one or more leaf nodes. The gateway infrastructure node 112 may also convert data between protocol(s) used by the network 106 and protocol(s) used by the nodes 108a-108e and 110a-110e. For example, the gateway infrastructure node 112 could convert Ethernet-formatted data transported over the network 106 into a wireless protocol format (such as an IEEE 802.11a, 802.11b, 802.11g, 802.11n, 802.15.3, 802.15.4, or 802.16 format) used by the nodes 108a-108e and 110a-110e. The gateway infrastructure node 112 could also convert data received from one or more of the nodes 108a-108e and 110a-110e into Ethernet-formatted data for transmission over the network 106. In addition, the gateway infrastructure node 112 could support various functions, such as network creation and security, used to create and maintain a wireless network. The gateway infrastructure node 112 includes any suitable structure for facilitating communication between components or networks using different protocols.

In particular embodiments, the various nodes in the wireless network of FIG. 1 form a mesh network communicating at 2.4 GHz or 5.8 GHz. A particular example of a wireless mesh network is the ONEWIRELESS network from HONEYWELL INTERNATIONAL INC. Also, in particular embodiments, data can be injected into the wireless mesh network through the infrastructure nodes, thus providing versatile, multifunctional, plant-wide coverage for wireless sensing, asset location tracking, personnel tracking, wireless communications, and any other or additional functionality as desired.

A wireless configuration and Object Linking and Embedding (OLE) for Process Control (OPC) server 114 can configure and control various aspects of the process control system 100. For example, the server 114 could configure the operation of the nodes 108a-108e and 112. The server 114 could also support security in the process control system 100, such as by distributing cryptographic keys or other security data to various components in the process control system 100 (like the nodes 108a-108e, 110a-110e, and 112). The server 114 includes any hardware, software, firmware, or combination thereof for configuring wireless networks and providing security information.

One challenge in industrial facilities is to improve the reliability of bi-directional wireless communication links between infrastructure and leaf nodes without increasing the cost and complexity of the leaf nodes' wireless radios. This disclosure provides techniques for improving the performance of a wireless sensor network or other network without placing additional cost or computational overhead on leaf nodes.

In one aspect of operation, the infrastructure nodes 108a-108e, 112 can use diversity receivers and transmit beam formers to communicate with leaf nodes 110a-110e (and possibly each other). The diversity receivers could use any suitable diversity techniques, such as spatial diversity using spatially separate receive antennas. The diversity receivers can enable better reception of data from the leaf nodes or other nodes in environments such as industrial plants. The transmit beam formers can enable more effective transmissions to the leaf nodes or other nodes in environments such as industrial plants, due to the transmitted beams being directed towards desired target nodes and reducing interference/noise to other nodes in the system. This architecture can be used in any suitable wireless network, such as those that operate using a master-slave scheme. Using diversity receivers and transmit beam formers can reduce the number of wireless nodes in a given area, which reduces the cost and complexity of the overall system and provides improved communication reliability and performance.

Although FIG. 1 illustrates one example of a process control system 100, various changes may be made to FIG. 1. For example, the process control system 100 could include any number of process elements, controllers, networks (wired or wireless), infrastructure nodes (gateway or other), leaf nodes, and servers. Also, the functional division shown in FIG. 1 is for illustration only. Various components in FIG. 1 could be combined, subdivided, or omitted and additional components could be added according to particular needs. In addition, FIG. 1 illustrates one example operational environment where diversity receivers and transmit beam formers could be used in wireless sensor networks and other wireless networks used for process control. This functionality could be used with any suitable device or system supporting industrial control and automation.

Figure 2:
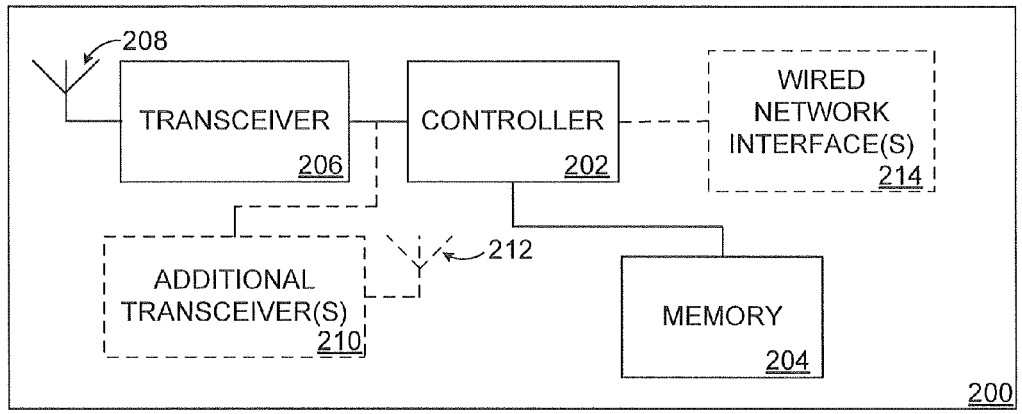
FIG. 2 illustrates an example wireless node in an industrial control and automation system according to this disclosure.

FIG. 2 illustrates an example wireless node 200 in an industrial control and automation system according to this disclosure. The wireless node 200 could, for example, represent a leaf node, infrastructure node, or gateway infrastructure node in the system 100 of FIG. 1 or other system.

As shown in FIG. 2, the node 200 includes a controller 202. The controller 202 controls the overall operation of the node 200. For example, the controller 202 may receive or generate data to be transmitted externally, and the controller 202 could provide the data to one or more other components in the node 200 for transmission over a wired or wireless network. The controller 202 could also receive data provided over a wired or wireless network and use or pass on the data.

As particular examples, the controller 202 in a sensor leaf node could provide sensor data for transmission, and the controller 202 in an actuator leaf node could receive and implement control signals (note that a leaf node could represent a combined sensor-actuator device). As another example, the controller 202 in an infrastructure node could receive data transmitted wirelessly, determine a next hop for the data (if any), and provide the data for transmission to the next hop (if any). As a third example, the controller 202 in a gateway infrastructure node could receive data from a wired network and provide the data for wireless transmission (or vice versa). The controller 202 could perform any other or additional functions to support the operation of the node 200.

The controller 202 includes any suitable hardware, software, firmware, or combination thereof for controlling the operation of the node 200. As particular examples, the controller 202 could represent a processor, microprocessor, microcontroller, field programmable gate array (FPGA), or other processing or control device.

A memory 204 is coupled to the controller 202. The memory 204 stores any of a wide variety of information used, collected, or generated by the node 200. For example, the memory 204 could store information received over one network that is to be transmitted over the same or different network. The memory 204 includes any suitable volatile and/or non-volatile storage and retrieval device or devices.

The node 200 also includes a wireless transceiver 206 coupled to an antenna 208. The transceiver 206 and antenna 208 can be used by the node 200 to communicate wirelessly with other devices. For example, in a leaf node, the transceiver 206 and antenna 208 can be used to communicate with infrastructure nodes. In an infrastructure node or gateway infrastructure node, the transceiver 206 and antenna 208 can be used to communicate with leaf nodes. One or more additional transceivers 210 could also be used in the node 200. For instance, in an infrastructure node or gateway infrastructure node, the additional transceiver(s) 210 could be used to communicate with WiFi or other devices (such as wireless controllers or hand-held user devices) and with other infrastructure nodes or gateway infrastructure nodes. The additional transceivers 210 may be coupled to their own antennas 212 or share one or more common antennas (such as antenna 208).

Each transceiver includes any suitable structure for generating signals to be transmitted wirelessly and/or receiving signals received wirelessly. In some embodiments, each transceiver represents an RF transceiver. Note that each transceiver could include a transmitter and a separate receiver. Also, each antenna could represent an RF antenna (although any other suitable wireless signals could be used to communicate). As described in more detail below, one or more of the transceivers can support diversity reception and beam-shaping and directional transmissions or receptions, along with possibly other features.

If the node 200 represents a gateway infrastructure node, the node 200 may further include one or more wired network interfaces 214. The wired network interfaces 214 allow the node 200 to communicate over one or more wired networks, such as the network 106. Each wired network interface 214 includes any suitable structure for transmitting and/or receiving signals over a wired network, such as an Ethernet interface.

In some embodiments, the node 200 may represent an infrastructure node (gateway or other) in the system 100. In these embodiments, the node 200 supports the use of diversity receivers for receiving data from leaf nodes or other nodes. The node 200 also supports the use of transmit beam formers for transmitting data to leaf nodes or other nodes. This provides improved communication reliability and performance in the presence of multi-path fading environments. Additional details regarding specific implementations of these types of wireless nodes are provided below.

Although FIG. 2 illustrates one example of a wireless node 200 in a process control system, various changes may be made to FIG. 2. For example, various components in FIG. 2 could be combined, subdivided, or omitted and additional components could be added according to particular needs. Also, in general, a "wireless node" may represent any device that can transmit and/or receive data wirelessly (even if the "wireless node" has the ability to transmit and/or receive data over a wired connection, as well).

Figure 3A:
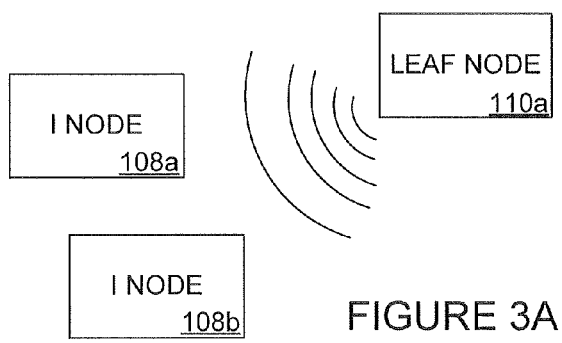
FIGS. 3A and 3B illustrate example communications in an industrial control and automation system according to this disclosure.
Figure 3B:
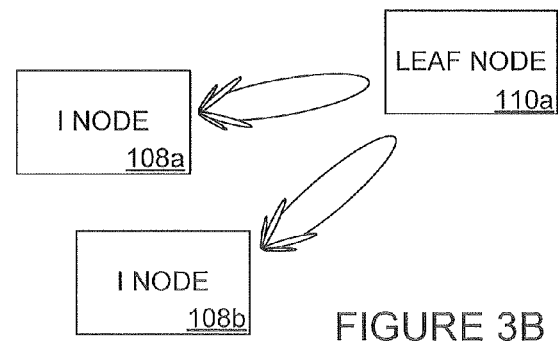

FIGS. 3A and 3B illustrate example communications in an industrial control and automation system according to this disclosure. More specifically, FIGS. 3A and 3B illustrate example communications between a leaf node 110a and two infrastructure nodes 108a-108b in the industrial control and automation system 100 of FIG. 1.

As noted above, diversity receivers and transmit beam formers can be used to facilitate improved wireless communications in a wireless network. In FIG. 3A, the leaf node 110a broadcasts wireless signals to multiple infrastructure nodes 108a-108b. As described in more detail below, each infrastructure node could include multiple antennas that form part of a diversity receiver for receiving the wireless signals from the leaf node 110a (or other nodes). A diversity receiver can be used to perform diversity reception at each infrastructure node.

A diversity receiver works on the assumption that the behavior of a channel/environment is random in nature and is independent (meaning it has nearly zero correlation with the behavior at different spatial regions of the channel). A diversity receiver typically includes multiple receiver front-ends with spatially separated antennas. Received signals undergo independent fades with respect to the receivers' sampling times. The signals from multiple front ends can be co-phased and constructively combined, such as by using a maximal-ratio combining technique, to obtain a better signal-to-noise ratio. In particular embodiments, the diversity combining can improve the communication reliability and performance in up-link communications from the leaf node 110a to the infrastructure nodes 108a-108b.

In FIG. 3B, the infrastructure nodes 108a-108b use beam-forming techniques to transmit wireless signals towards the leaf node 110a. Beam-forming generally involves more directional transmissions of wireless signals, where narrower transmission beams are used (rather than a simple broadcast into free space). In particular embodiments, multiple antennas in the front-ends can be used to perform transmit beam forming for down-link communications from the infrastructure nodes 108a-108b to the leaf node 110a.

These approaches can provide various advantages or benefits depending on the implementation. These advantages or benefits can include the following.

Reliable communications: Diversity combining can give diversity gain at a receiver in flat or selective fading scenarios, which can ensure reliable communications in fading channel conditions.

Power efficiency: Because of diversity gain, normal transmission power may be needed in fading conditions, and less transmission power may be needed when no fading occurs. Also, because of diversity gain, leaf nodes may transmit at lower power levels compared to receivers that lack diversity.

Interference suppression: Transmit beam forming at one infrastructure node can reduce interference with other infrastructure nodes.

Capacity improvement: Since infrastructure nodes transmit narrower beams, the overall capacity of the system can be increased due to the lower noise generated.

Spectral efficiency: Since the license-free spectrum is overcrowded, the use of transmit beam formers can reduce the self-interference of the system by forming narrow transmit beams for leaf nodes because the wireless radiation is directed substantially only towards the desired destination(s).

Effective routing/cooperative routing: Efficient routing can be done using directional beams. Routing may be done by transmitting a narrow beam from one infrastructure node to another infrastructure node. This reduces the likelihood that other infrastructure nodes will receive and need to process a message.

Reduced cost: The overall system cost can be reduced because of reliability, power efficiency, and increased capacity.

Low network complexity: The above advantages can reduce the overall complexity of the system.

No additional overhead on the leaf nodes.

Although FIGS. 3A and 3B illustrate two examples of communications in an industrial control and automation system, various changes may be made to FIGS. 3A and 3B. For example, a leaf node could communicate with any number of infrastructure nodes. Also, an infrastructure node could communicate with any number of leaf nodes.

FIGS. 4 through 19B illustrate example diversity receivers for use in a wireless node of an industrial control and automation system and related details according to this disclosure. The diversity receivers could, for example, be used within the transceiver 206 and/or 210 of an infrastructure node (gateway or other).

Figure 4:
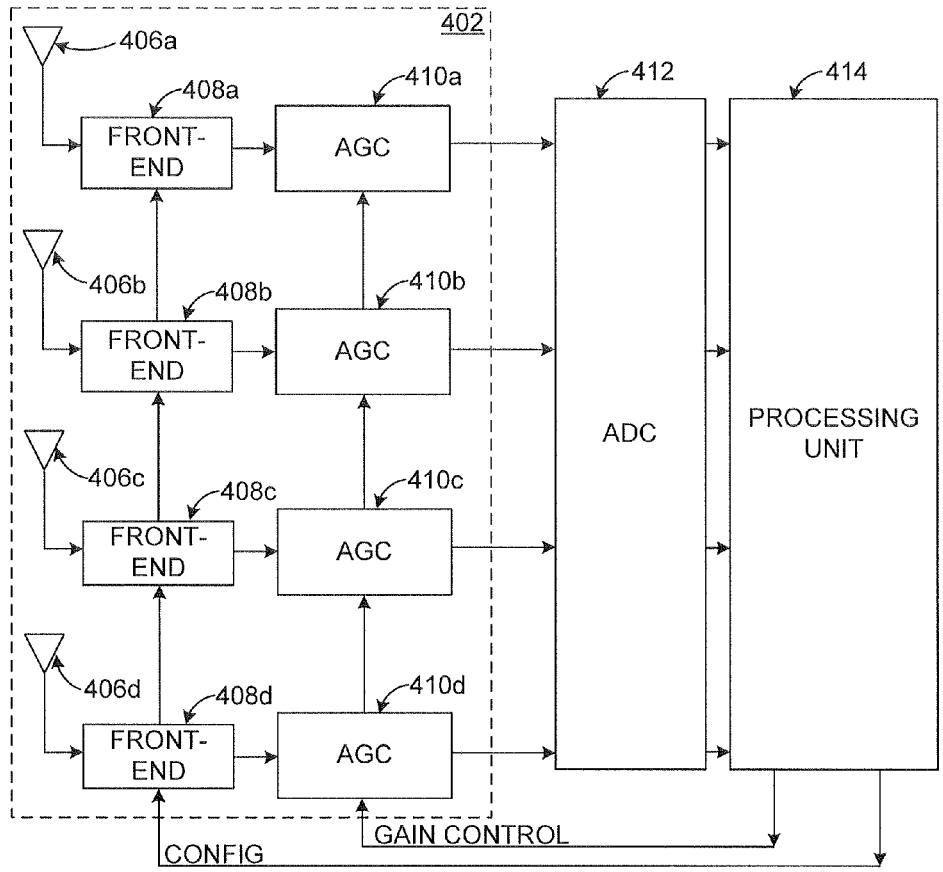
FIGS. 4 through 19B illustrate example diversity receivers for use in a wireless node of an industrial control and automation system and related details according to this disclosure.

As shown in FIG. 4, a diversity receiver 400 includes a front-end section 402. The front-end section 402 in this example includes four antennas 406a-406d, four front-ends 408a-408d, and four automatic gain control (AGC) units 410a-410d. Each antenna 406a-406d includes any suitable structure for receiving wireless signals, such as an RF antenna. Each front-end 408a-408d includes any suitable structure for generating electrical signals corresponding to received wireless signals, such as by filtering and down-converting the received signals. Each AGC unit 410a-410d includes any suitable structure for applying a controllable gain to an output of a front-end.

In particular embodiments, the front-end section 402 receives 2.4 GHz-2.4835 GHz frequency hopping spread spectrum (FHSS) wireless signals with a 1 MHz channel space and a frequency deviation of ±250 kHz. The signals contain data encoded at 250 kbps using Gaussian frequency-shift keying (GFSK). The signals may have a bandwidth-time product of two and a modulation index of two. The front-end section 402 could output 2 MHz intermediate frequency (IF) signals with a 1 MHz bandwidth and a signal-to-noise ratio (SNR) of 9 db-12 db.

The diversity receiver 400 also includes components for processing the signals output by the front-end section 402. In this example, the diversity receiver 400 includes an analog-to-digital converter (ADC) unit 412 and a processing unit 414. The ADC unit 412 receives analog signals from the front-end section 402 and generates corresponding digital signals. The ADC unit 412 includes any suitable structure for digitizing analog signals, such as a four-channel ADC like an ANALOG DEVICES AD9259 converter. The processing unit 414 processes the digitized signals to perform diversity combining. The processing unit 414 also generates gain control signals for controlling the gain provided by the AGC units 410a-410d and configuration parameters for configuring the front-ends 408a-408d. The processing unit 414 includes any suitable structure for performing diversity combining, such as a field programmable gate array (FPGA) like a XILINX VIRTEX 4 family FPGA or a digital signal processor (DSP) like an ANALOG DEVICES TIGERSHARC processor.

Depending on the implementation, the processing unit 414 can perform any suitable type of diversity combining. For example, the processing unit 414 could perform pre-detection combining, meaning the diversity combining occurs prior to detection of data and synchronization to frames of data. The processing unit 414 could also perform post-detection combining, meaning the diversity combining occurs after detection of data and synchronization to frames of data.

In particular embodiments, the processing unit 414 can implement a software-defined radio. Also, the front-ends 408a-408d can be discrete RF radios based on a superheterodyne receiver architecture to obtain a better sensitivity and a selective and very low noise figure. A received RF signal can be brought down to a very low intermediate frequency so that the digital processing can be performed at very low sampling rates. This implementation of a diversity receiver can support:

diversity reception implemented using multiple front-ends 408a-408d, which can improve the performance of wireless communications and improve link reliability in a multi-path environment;

beam forming in the front-ends 408a-408d (when the front-ends 408a-408d are used for transmissions), which can reduce interference and increase system performance;

software re-configurable radios to support various standards, such as IEEE 802.15.4 and FHSS; and localization of leaf nodes by infrastructure nodes based on the direction of arrival of signals from the leaf nodes, which can then be used to control the beam forming in order to transmit beams in roughly the same direction as leaf node signals are received.

Figure 5:
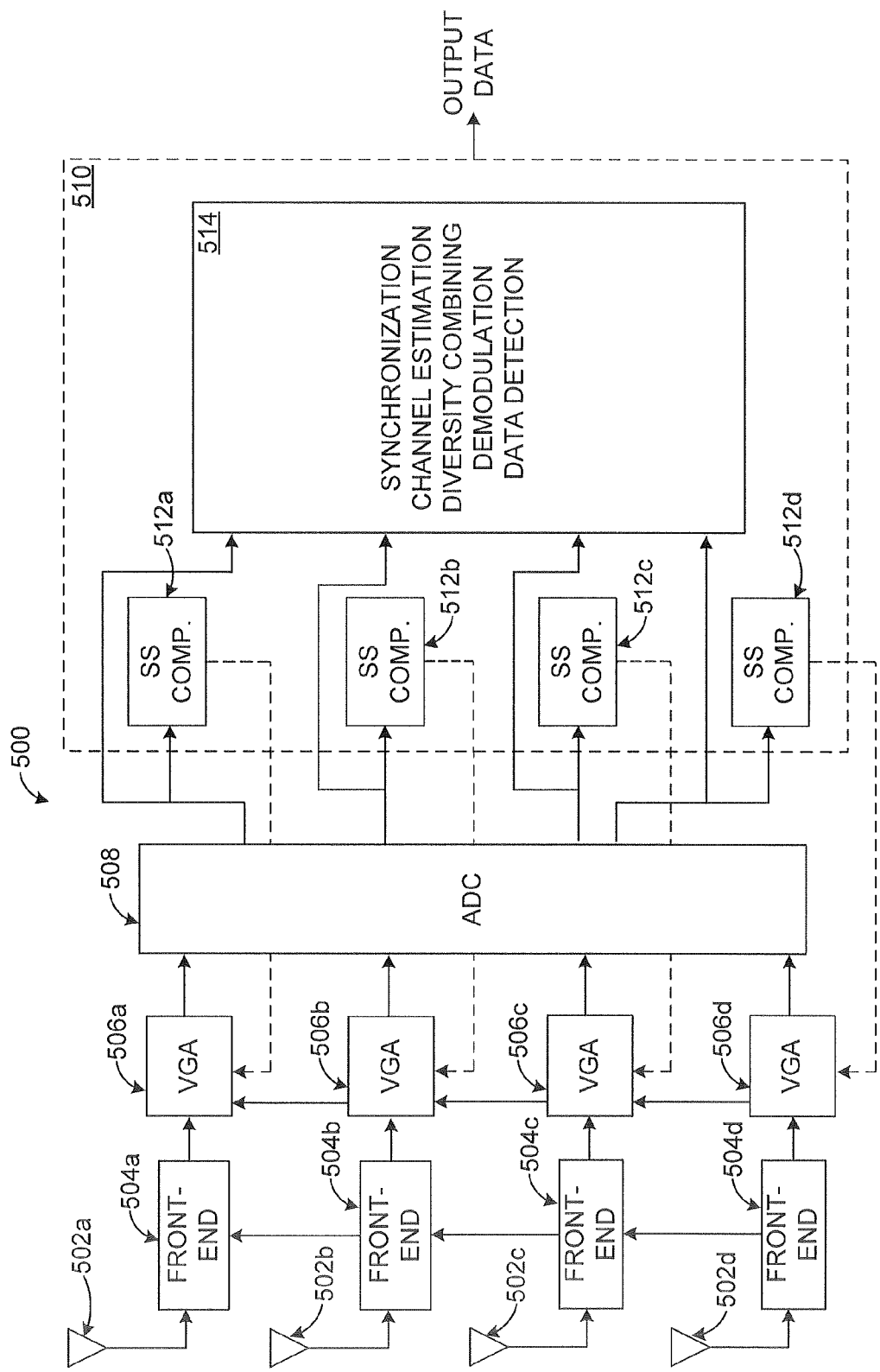

As shown in FIG. 5, a diversity receiver 500 includes four antennas 502a-502d, such as four 2.4 GHz RF antennas. The diversity receiver 500 also includes four front-ends 504a-504d, such as four RF front-ends. The diversity receiver 500 further includes four variable gain amplifiers (VGA) 506a-506d, each of which provides a variable amount of amplification to produce an intermediate frequency signal, such as a 2 MHz signal. Each variable gain amplifier 506a-506d includes any suitable structure for providing a variable amount of amplification, such as an ANALOG DEVICES AD8331 VGA. Analog outputs from the variable gain amplifiers 506a-506d are provided to an analog-to-digital converter 508, which digitizes the analog signals. The antennas, front-ends, and ADC here could be the same as or similar to the corresponding components in FIG. 4.

The digital signals are processed in a processing section 510, which could represent a DSP such as an ANALOG DEVICES ADSP-TS201S TIGERSHARC processor. In this example, the processing section 510 implements four signal strength comparators (SS COMP.) 512a-512d, which compare the digital signals with specified signal strengths to control the amplification provided by the variable gain amplifiers 506a-506d. The processing section 510 also implements a signal processing unit 514, which implements functions such as synchronization, channel estimation, diversity combination, demodulation, and data detection. The signal processing unit 514 could implement any suitable diversity combination technique, such as maximal ratio combining (MRC) or equal gain combining (EGC).

Figure 6:
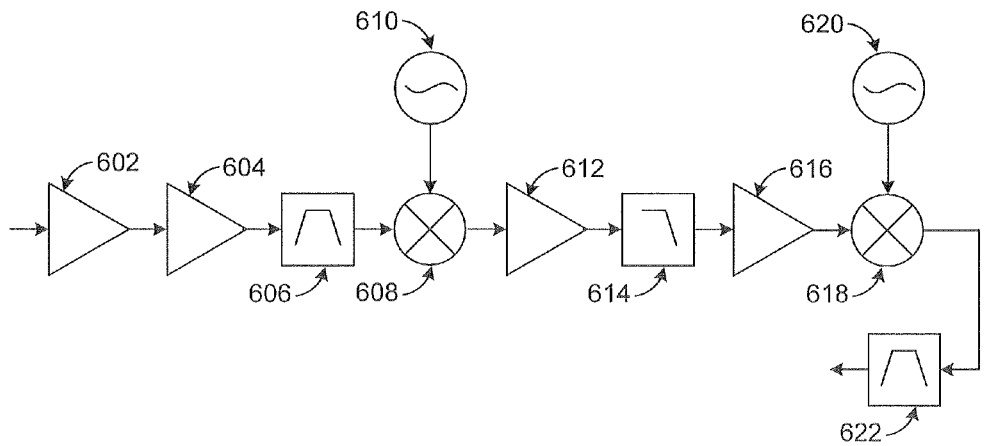

FIG. 6 illustrates an example embodiment of the front-ends 408a-408d, 504a-504d. In this example, each front-end includes two low-noise amplifiers 602-604, which could represent TRIQUINT SEMICONDUCTOR TQM3M7001 amplifiers. The amplifier 604 is coupled to a bandpass filter 606, which could represent an ANALOG DEVICES AFS2442 filter. The filter 606 is coupled to a mixer 608, which mixes an output of the filter 606 with an output of a clock source 610. The mixer 608 could represent a MAXIM INTEGRATED PRODUCTS MAX2043 mixer, and the clock source 610 could represent an ANALOG DEVICES ADF4118 phase-locked loop (PLL). The mixer 608 is coupled to a gain amplifier 612, which could represent an ANALOG DEVICES ADL5542 gain block. The amplifier 612 is coupled to a low-pass filter 614, which could represent a TRIQUINT SEMICONDUCTOR 854652 filter. The filter 614 is coupled to a gain amplifier 616, which could represent another ANALOG DEVICES ADL5542 gain block. The amplifier 616 is coupled to a mixer 618, which mixes an output of the amplifier 616 with an output of a clock source 620. The mixer 618 could represent a LINEAR TECHNOLOGY LT5512 mixer, and the clock source 620 could represent an ANALOG DEVICES ADF4002 synthesizer. The mixer 618 is coupled to a bandpass filter 622, which could represent a −3 db filter. The filter 622 outputs a signal to an AGC unit 410a-410d or variable gain amplifier 506a-506d, which could represent an ANALOG DEVICES AD8331 VGA or other differential output device.

Figure 7A:
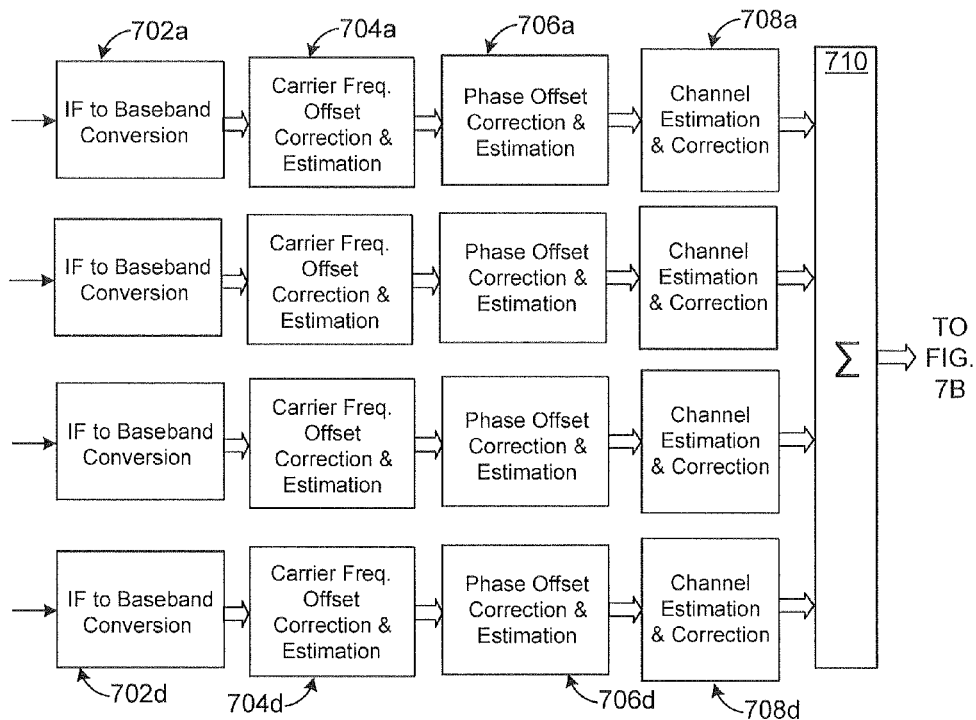
Figure 7B:
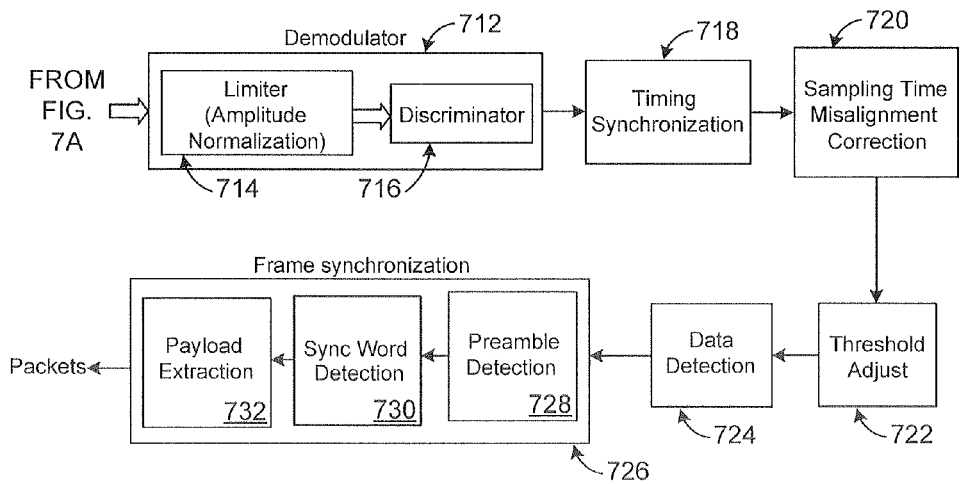
Figure 7C:
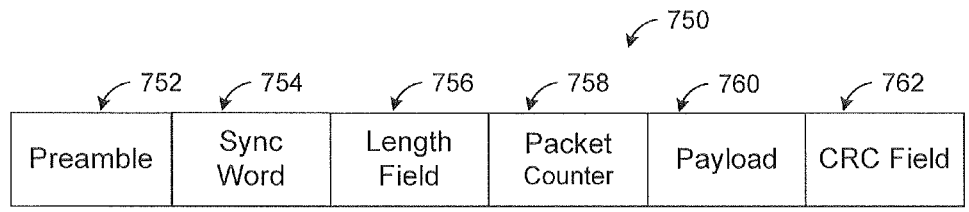
Figure 7D:
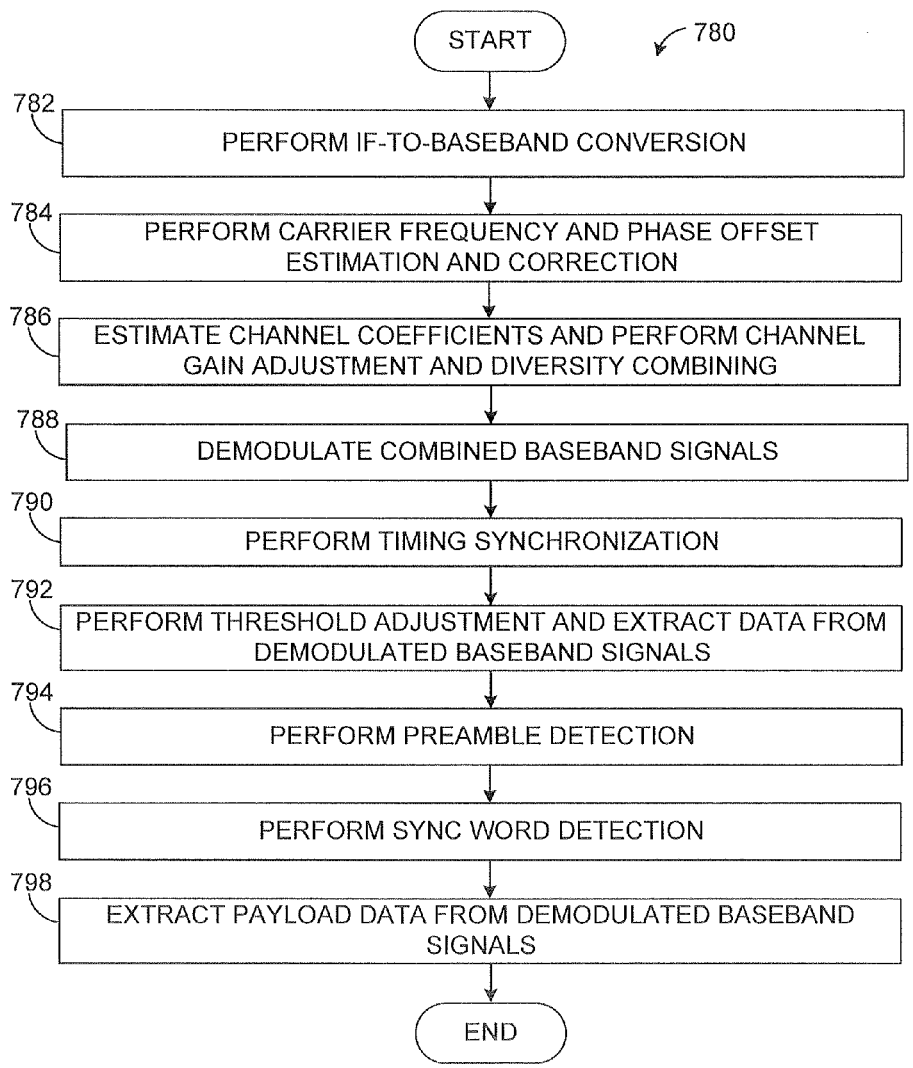

FIGS. 7A and 7B illustrate an example embodiment of the processing unit 414, 514. FIG. 7C illustrates example data frames processed using this component, and FIG. 7D illustrates example operations performed by this component. As shown in FIG. 7A, the processing unit 414, 514 includes intermediate frequency to baseband conversion units 702a-702d, which convert received intermediate frequency signals (such as 2 MHz signals) into baseband signals.

The processing unit 414, 514 also includes components for carrier recovery that are used to ensure the different baseband signals have substantially equal frequencies and phases. Four carrier frequency offset correction and estimation units 704a-704d estimate and correct carrier frequency offset variations in the baseband signals. Four phase offset correction and estimation units 706a-706d estimate and correct phase offset variations across the baseband signals so that the baseband signals are in phase (coherent) with each other.

In addition, the processing unit 414, 514 includes four channel estimation and correction units 708a-708d and a combiner (Σ) 710. The channel estimation and correction units 708a-708d estimate channel coefficients for the corrected baseband signals and perform channel gain adjustment. The combiner 710 combines the corrected baseband signals based on the channel coefficients, such as by using MRC or EGO combining.

As shown in FIG. 7B, the output from the combiner 710 is processed by the processing unit 414, 514 to extract data packets from the combined baseband signals. In this example, the processing unit 414, 514 includes a demodulator 712, which demodulates the combined baseband signals. The demodulator 712 here contains a limiter 714 used for amplitude normalization and a discriminator 716 used for identifying maximum pulses. A time synchronization unit 718 performs timing recovery, such as bit timing synchronization, and attempts to synchronize with a clock associated with the transmitted data. A sampling time misalignment correction unit 720 corrects for any misalignment involving the sampling of the demodulated baseband signals.

A threshold adjust unit 722 adjusts a threshold for distinguishing between different data values, such as a threshold for distinguishing between +1 and −1 data values. A data detection unit 724 uses the threshold to extract data values from the demodulated baseband signals. A frame synchronization unit 726 synchronizes with frame boundaries in the data values extracted from the demodulated baseband signals. The frame synchronization unit 726 includes a preamble detection unit 728 that detects one or more specified preambles and a sync word detection unit 730 that detects one or more specified sync words in the data values. Once aligned, a payload extraction unit 732 extracts packets of data from the demodulated baseband signals.

FIG. 7C illustrates an example frame 750 that can be processed using the processing unit 414, 514. Here, the frame 750 includes a preamble 752, a sync word 754, a length 756, a packet counter 758, a payload 760, and cyclic redundancy check (CRC) data 762. In particular embodiments, the preamble 752, sync word 754, and payload 760 are each four bytes, the length 756 is one byte, and the packet counter 758 and CRC data 762 are each two bytes. The preamble 752 could be a repeating pattern of "10" bits, the sync word 754 could have a value of "D391DA26," and the length 756 could have a value of "07." In a test packet, the payload could have a value of "AA5555AA," and the CRC data 762 could have a value of "2222." Each byte could require 32 µs to transmit.

FIG. 7D illustrates an example method 780 that could be performed by the processing unit 414, 514. Intermediate frequency to baseband conversion occurs at step 782, and carrier frequency and phase offset estimation and correction occur at step 784. Channel coefficients are estimated and channel gain adjustment and diversity combining occur at step 786. The combined baseband signals produced from the diversity combining are demodulated at step 788, and timing synchronization occurs at step 790. Threshold adjustment is performed and data is extracted from the demodulated baseband signals using the threshold at step 792. Preamble detection occurs at step 794, such as by detecting the presence of a preamble 752 in a data stream from the data detection unit 724. Sync word detection occurs at step 796, such as by detecting the presence of a sync word 754 in the data stream from the data detection unit 724. Payload extraction, such as the retrieval of data from the payload 760 of a frame, is performed at step 798.

Note that various steps in FIG. 7D (or operations in the diversity receiver 400, 500) need not be performed or need not be performed serially. For example, in some embodiments, payload extraction occurs only after the preamble 752 and sync word 754 have been detected. In other embodiments, payload extraction can occur after the preamble 752 is detected, even if the sync word 754 is not detected. As another example, after carrier frequency offset estimation and correction, a determination can be made whether the baseband signals are already in phase and, if so, the phase offset estimation and correction can be skipped.

Figure 8A:
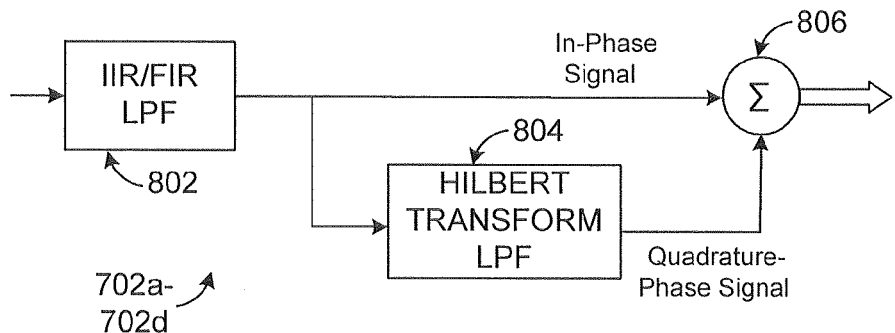

FIGS. 8A through 8E illustrate example embodiments of the intermediate frequency to baseband conversion units 702a-702d from FIG. 7A and example conversion operations. As shown in FIG. 8A, each conversion unit 702a-702d could include an infinite impulse response (IIR) or finite impulse response (FIR) low-pass filter (LPF) 802, a Hilbert transform low-pass filter 804, and a summer 806. The filter 802 filters the data and produces in-phase samples. The Hilbert transform filter 804 processes the in-phase samples to produce quadrature-phase samples. Each of these filters 802-804 could have a passband with a starting frequency ($f_p$) of 500 kHz. The summer 806 sums the in-phase and quadrature-phase samples to produce final samples of a baseband signal.

Figure 8B:
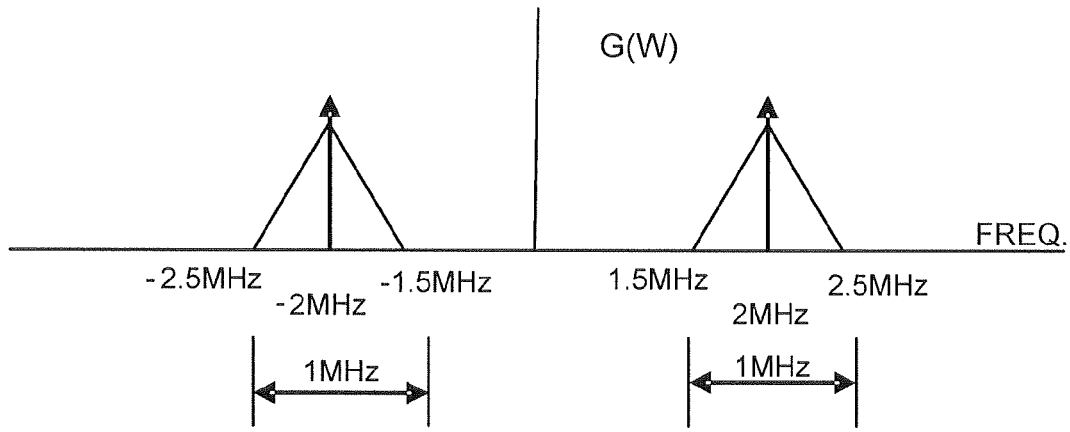
Figure 8C:
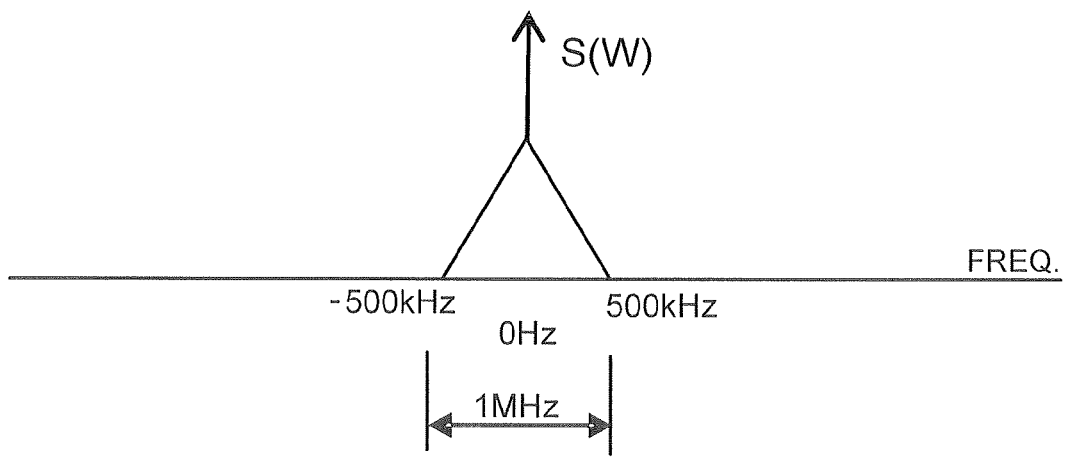

Example operation of these components is graphically illustrated in FIGS. 8B and 8C. Namely, FIG. 8B illustrates the power spectral density (PSD) of example in-phase and quadrature-phase samples, while FIG. 8C illustrates the power spectral density of the combined in-phase and quadrature-phase samples produced by the summer 806. In particular embodiments, an intermediate frequency signal received from the analog-to-digital converter 412, 508 could be expressed as:

$$r_{IF}(t) = A \cdot Re\{e^{j(2\pi \cdot (f_{IF}+\Delta f)\cdot t+\varphi_{GFSK}(t)+\Theta_0(t))}\} \quad (1)$$
$$= A \cdot \cos(2\pi \cdot (f_{IF}+\Delta f)\cdot t + \varphi_{GFSK}(t) + \Theta_0(t))$$

where $f_{IF}$ denotes the intermediate frequency, $\Delta f$ denotes the frequency offset, $\phi_{GFSK}(t)$ denotes the GFSK baseband signal, $\Theta_0(t)$ denotes the phase offset, and A denotes the amplitude.

In this example, the intermediate frequency signal is centered at 2 MHz as shown in FIG. 8B. Bandpass sampling or low-pass sampling could be performed for baseband conversion. In a low-pass sampling method, the ADC's sampling rate could be configured to be higher than the Nyquist sampling rate, such as six mega-samples per second (MSPS). The sampling of the intermediate frequency signal can involve detecting an impulse train in the signal and defining a window around each impulse. If the window has a width 2W of 1 MHz and $f_{IF}$ equals 2 W·k, then $f_s=2$ W·k (where k=1, 2, ... ). If k equals six, the sampling rate could be 6 MHz. The sampled signal can be expressed as:

$$S_{cmplx\_base}\left(n \cdot \frac{1}{12W}\right) = A \cdot \{e^{j(2\pi\cdot\Delta f)\cdot(n\frac{1}{12W})+\varphi_{GFSK}(n\frac{1}{12W})+\Theta_0(n\frac{1}{12W}))}\}. \quad (2)$$

A simplified baseband signal produced by the baseband conversion unit 702a-702d could be expressed as:

$$r_{base}\left(n \cdot \frac{1}{12W}\right) = \quad (3)$$
$$A \cdot \cos\left(2\pi \cdot \Delta f \cdot n \cdot \frac{1}{12W} + \varphi_{GFSK}\left(n \cdot \frac{1}{12W}\right) + \Theta_0\left(n \cdot \frac{1}{12W}\right)\right).$$

In a bandpass sampling method, the ADC's sampling frequency could be configured for 2 MSPS, which directly brings the intermediate frequency signal to baseband centered at 0 Hz as shown in FIG. 8C. The bandpass-sampled signal can also be processed using an IIR or FIR low-pass filter and using a Hilbert transform filter as show in FIG. 8A.

Figure 8D:
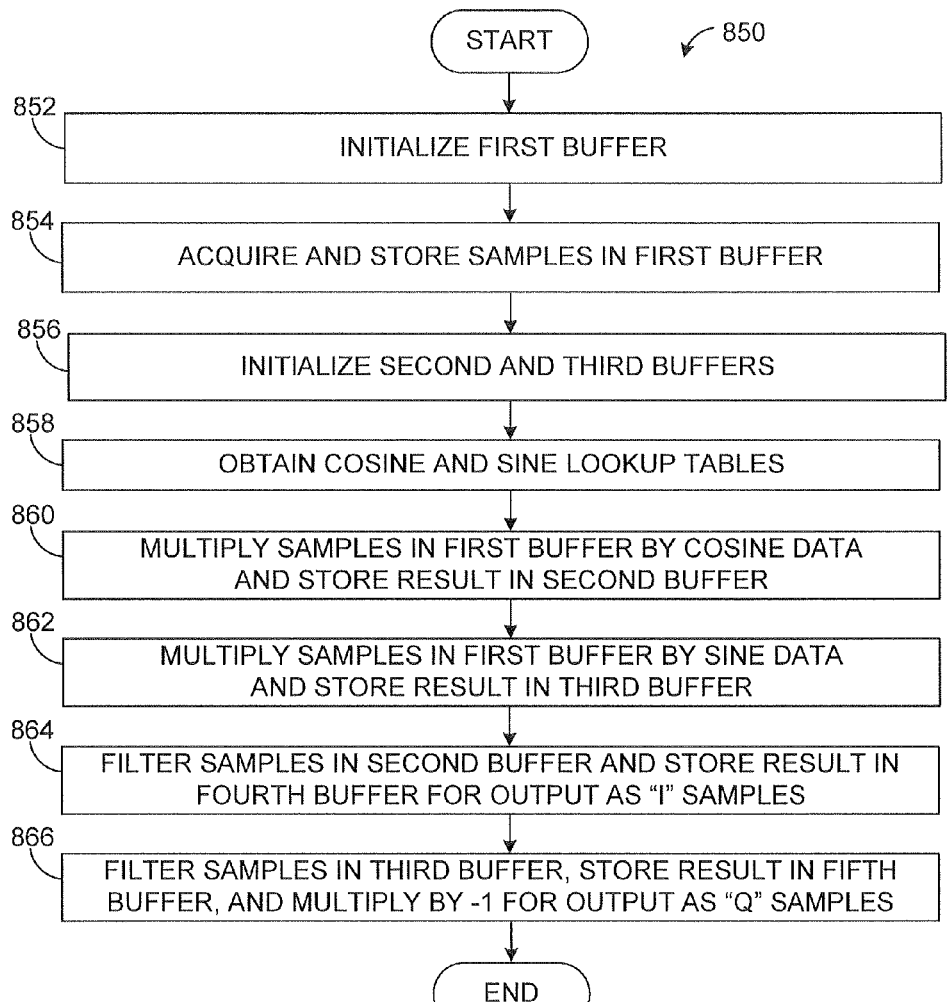

FIG. 8D illustrates an example method 850 for intermediate frequency to baseband conversion. A first buffer is initialized at step 852, such as by allocating space in the memory 204 for the first buffer. A "buffer" denotes a memory space for storing data values. The first buffer could have a size equal to the size of the preamble 752 in a frame, such as four bytes. Incoming data signal samples of this length are acquired and stored in the first buffer at step 854.

Second and third buffers (possibly of the same size) are initialized at step 856, and cosine and sine lookup tables are obtained at step 858. The cosine and sine lookup tables could be associated with a specific type of expected incoming signal, such as a signal with a 2 MHz carrier frequency and a 6 MHz sampling frequency. The cosine and sine lookup tables could be stored in the memory 204 or other location(s).

Figure 8E:
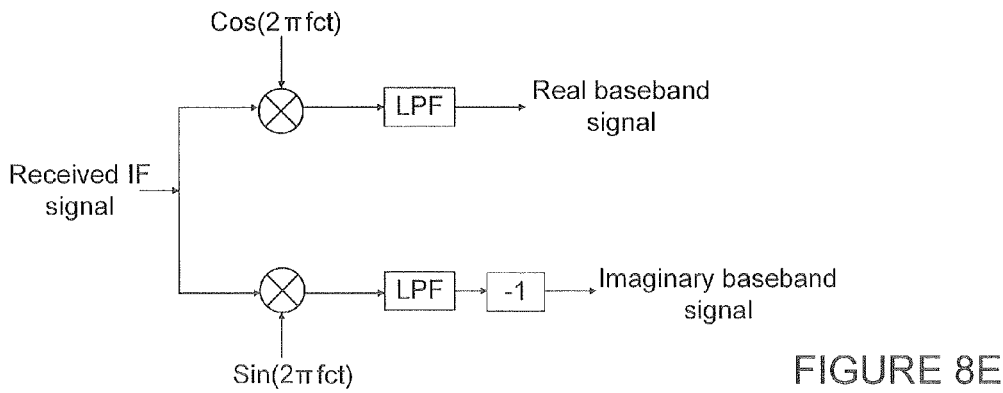

Samples in the first buffer are multiplied on a sample-by-sample basis with the cosine data and stored in the second buffer at step 860. Samples in the first buffer are multiplied on a sample-by-sample basis with the sine data and stored in the third buffer at step 862. The samples in the second buffer are filtered (such as FIR filtering), stored in a fourth buffer, and output as "I" samples at step 864. The samples in the third buffer are filtered (such as IIR filtering), stored in a fifth buffer, multiplied by −1 to rotate the samples, and output as "Q" samples at step 866. An intermediate frequency to baseband conversion unit implementing this approach is illustrated in FIG. 8E. The two low-pass filters in FIG. 8E could be FIR or IIR filters with a 500 kHz pass-band bandwidth.

Figure 9A:
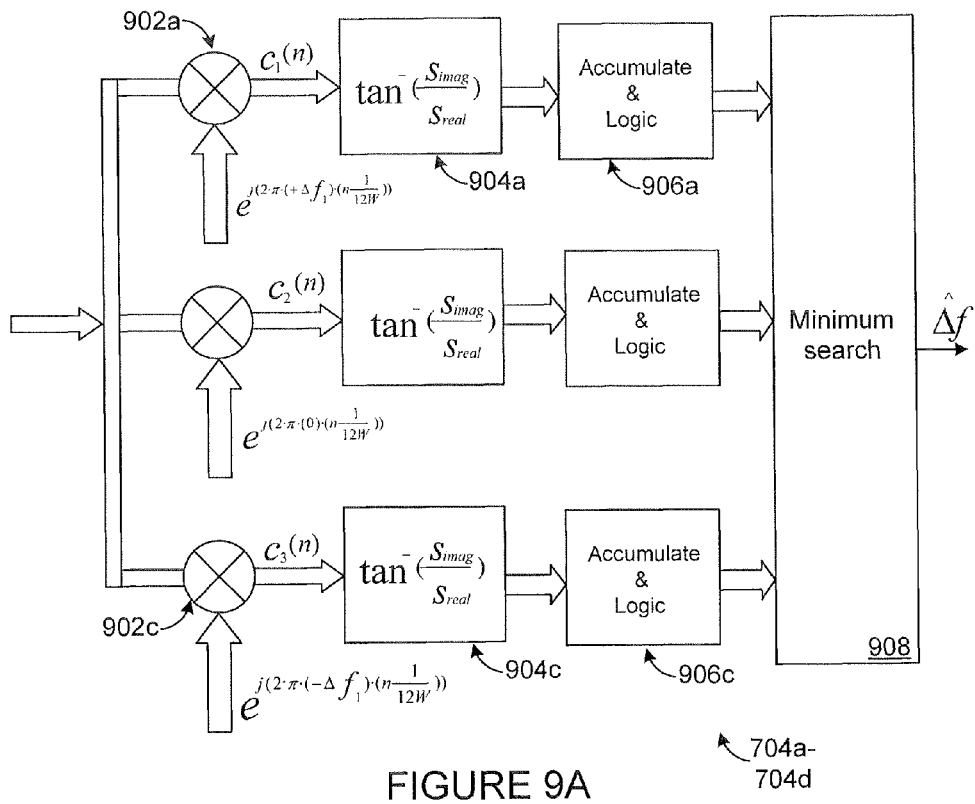
Figure 9B:
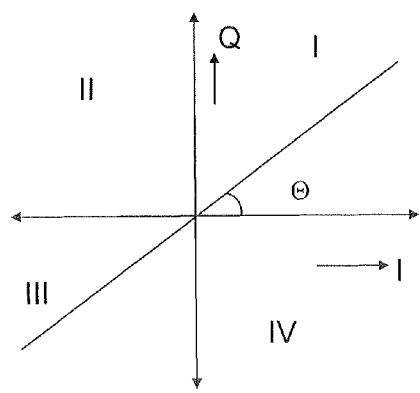
Figure 9C:
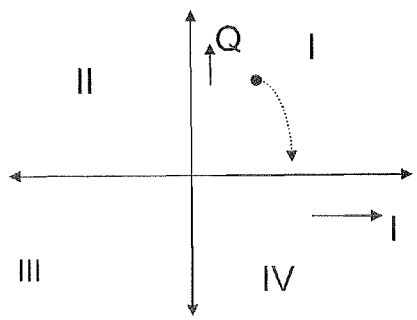

FIGS. 9A through 9C illustrate an example embodiment of the carrier frequency offset correction and estimation units 704a-704d from FIG. 7A and example offset correction and estimation operations. In general, a transmit oscillator can be used at a wireless transmitter to generate a sinusoidal carrier wave that ideally exists at some known carrier frequency. The actual frequency may deviate from the ideal value, however. This carrier can be multiplied by data to modulate the signal up to a passband center frequency. At a receiver, the passband signal can be multiplied by a sinusoid from a local oscillator. In practice, the frequencies of the local and transmit oscillators differ and, instead of demodulation bringing a received wireless signal to baseband, the signal may be near baseband with some frequency offset. The presence of this frequency offset can cause a received signal constellation to rotate. This "spinning" effect may be removed so that accurate symbol capture can be performed at the receiver. Carrier recovery can also remove frequency offset so that the received signal can be processed directly at baseband.

As shown in FIG. 9A, the correction and estimation unit 704a-704d receives a baseband signal at three mixers 902a-902c. Each mixer 902a-902c mixes the baseband signal with different signals, which involve different phases of an expected frequency offset limit $\Delta f_1$. The mixers 902a-902c produce intermediate signals $c_1(n)$-$c_3(n)$. If the frequency offset of is very close to the expected limit $\Delta f_1$, the intermediate signals could be expressed as:

$$c_1(n)=e^{j(2\pi\cdot\Delta f\cdot n+\phi_{GFSK}(n)+\Theta_0(n))} * e^{j(2\pi\cdot\Delta f_1\cdot n)} = e^{j(2\pi\cdot(\Delta f+\Delta f_1)\cdot n+\phi_{GFSK}(n)+\Theta_0(n))} \quad (4)$$

$$c_2(n)=e^{j(2\pi\cdot\Delta f\cdot n+\phi_{GFSK}(n)+\Theta_0(n))} * e^{j(2\pi\cdot 0\cdot n)} = e^{j(2\cdot2\pi(\Delta f)\cdot n+\phi_{GFSK}(n)+\Theta_0(n))} \quad (5)$$

$$c_3(n)=e^{j(2\pi\cdot\Delta f\cdot n+\phi_{GSFK}(n)+\Theta_0(n))} * e^{j(2\pi\cdot(-\Delta f_1)\cdot n)} = e^{j(2\pi\cdot(\Delta f-\Delta f_1)\cdot n+\phi_{GFSK}(n)+\phi_{GFSK}(n)+\Theta_0(n))}. \quad (6)$$

The intermediate signals are provided to tangent computation units 904a-904c, which compute tangent values involving imaginary and real components forming the intermediate signals. The tangent values are provided to accumulate and logic units 906a-906c, which accumulate the values over time. A minimum search unit 908 determines which of the accumulated values represents a more accurate estimation of the carrier frequency offset, which is output as $\Delta\hat{f}$. The phase offset correction and estimation units 706a-706d could have a similar structure and operate in a similar manner (although they would output a more accurate estimation of the phase offset).

The operation of an example minimum search unit 908 is illustrated in FIGS. 9B and 9C. Here, an arm for each of the three paths in FIG. 9A is plotted in an I/Q plot, and the phases of each arm are observed over a large number of symbol durations. A $+\pi$ can be added to all of the observed phases to bring them into a single quadrant. The arm that is varying the slowest in phase may represent the closest arm for the frequency offset.

Each of the channel estimation and correction units 708a-708d from FIG. 7A may operate as follows. In some embodiments, Least Sum of Squared Errors (LSSE) channel estimation can be used to estimate a channel impulse response from a known training sequence. An observed received signal vector expressed as:

$$r = \lfloor r_0, r_1, \ldots, r_{N'_p-1} \rfloor \quad (7)$$

may contain $N_p'$ observed samples and can be modeled as:

$$r_k = \sum_{l=0}^{L} h_l p_{k-l} + n_k = h^t p_k + n_k \quad (8)$$

where $k=0, \ldots, N_p'-1$. The superscript t denotes a vector or matrix transpose. Here, $h=[h_0, h_1, \ldots, h_L]$ is the discrete T-spaced channel response, $N_{ct}=L+1$ is the number of channel taps (where L denotes the channel memory), and:

$$p = \lfloor p_{-L}, p_{-L+1}, \ldots p_0, \ldots p_{N'_p-1} \rfloor \quad (9)$$

is the complete preamble sequence with:

$$p_k = \lfloor p_k, p_{k-1}, \ldots p_{k-L} \rfloor \quad (10)$$

The observed noise sequence can be expressed as:

$$n = \lfloor n_0, \ldots n_{N'_p-1} \rfloor \quad (11)$$

and can be modeled as discrete complex additive white Gaussian noise (AWGN) with variance $\sigma_n^2 = N_0$. The channel can be estimated using the LSSE criterion. The sum of squared errors (SSE) for a given channel estimate $\hat{h}$ can be defined as:

$$sse(\hat{h}) = |r - \hat{r}|^2 = \sum_{k=0}^{N'_p-1} |r_k - \hat{r}_k|^2 \quad (12)$$

where $$\hat{r}_k = \sum_{l=0}^{L} \hat{h}_l p_{k-l} = \hat{h}^t p_k \quad (13)$$

for $k=0, \ldots, N_p'-1$. After substitution, the following can be obtained:

$$sse(\hat{h}) = E_r - 2 \cdot \text{Re}[z^t \hat{h}^*] + \hat{h}^t P \hat{h}^* \quad (14)$$

where:

$$E_r = |r|^2 = \sum_{k=0}^{N'_p-1} |r_k|^2 \quad (15)$$

is the energy of the received signal r.

Let z denote an $N_{ct}$-dimensional column vector with the $l^{th}$ element given by:

$$Z_l = \sum_{k=0}^{N'_p-1} r_k p_{k-l}^* \quad (16)$$

for $l=0, \ldots, L$. Using the vector notation:

$$Z_l = \sum_{k=0}^{N'_p-1} r_k p_k^* \quad (17)$$

where $$N_p = N_p' + L, \quad (18)$$

P is an $N_{ct}$-by-$N_{ct}$ preamble correction matrix with the $(i,j)^{th}$ element given by:

$$p_{i,j} = \sum_{k=0}^{N'_p-1} p_{k-i} p_{k-j}^* \quad (19)$$

or $$P = \sum_{k=0}^{N'_p-1} p_k p_k^{*t} \quad (20)$$

where $P^T = P^*$. In these embodiments, each channel estimation and correction unit 708a-708d operates to find the $\hat{h}$ vector that provides the LSSE:

$$sse(\hat{h}) = E_r - z^t(Vz)^* + (Vz - \hat{h})^t P(Vz - \hat{h})^* \quad (21)$$

where $V = P^{*-1}$ and $\hat{h}_{opt} = Vz$.

Figure 10A:
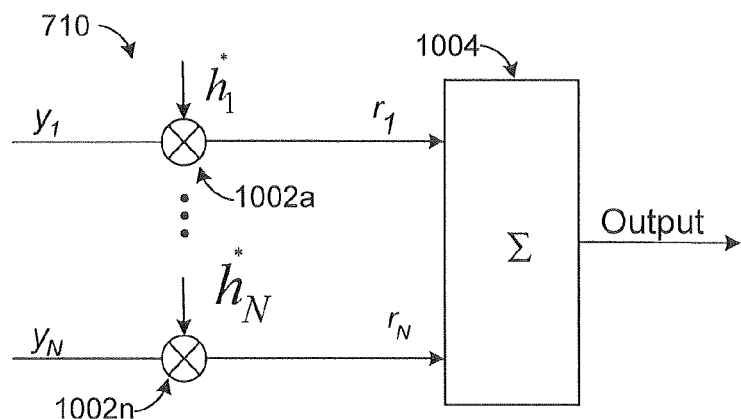
Figure 10B:
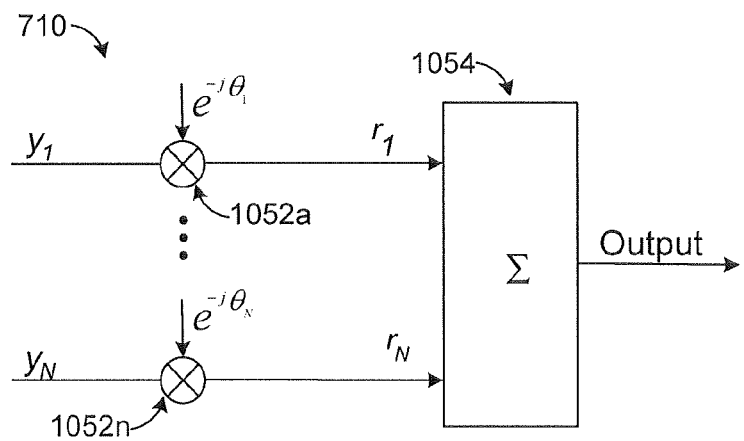

FIGS. 10A and 10B illustrate example embodiments of the combiner 710 from FIG. 7A. As noted above, there are various types of diversity combining that may be performed. These can include various selection combining and switched combining techniques. FIG. 10A illustrates a combiner 710 implementing maximal ratio combining, where signals $y_1$-$y_n$ on multiple branches are mixed by mixers 1002a-1002n with channel estimates $\hat{h}_1$-$\hat{h}_N$ to produce signals $r_1$-$r_n$. The signals $r_1$-$r_n$ rare combined by a summer 1004. The output of the mixer on the $k^{th}$ branch can be expressed as:

$$r_k = |h_k|^2 \cdot x + \hat{h}_k \cdot n_k. \quad (22)$$

The output of the combiner 710 can be expressed as:

$$r = \sum_{k=1}^{N} |h_k|^2 \cdot x + \sum_{k=1}^{N} (h_k^* \cdot n_k). \quad (23)$$

The power of the signal component output by the combiner 710 could be expressed as:

$$\left[\sum_{k=1}^{N} |h_k|^2\right]^2 \cdot E_s. \quad (24)$$

The power of the noise output by the combiner 710 could be expressed as:

$$E\left|\sum_{k=1}^{N} (h_k^* \cdot n_k)\right|^2 = \sum_{k=1}^{N} |h_k|^2 \cdot \sigma_n^2. \quad (25)$$

With this, the SNR of the combiner 710 could be written as:

$$\gamma = \frac{\left[\sum_{k=1}^{N} |h_k|^2\right]^2 \cdot E_s}{\sum_{k=1}^{N} |h_k|^2 \cdot \sigma_n^2} \implies \gamma = \sum_{k=1}^{N} |h_k|^2 \cdot \gamma_0 = \sum_{k=1}^{N} \gamma_k. \quad (26)$$

The SNR of the MRC approach generally equals the sum of the SNRs for the individual branches, and MRC may represent the optimum diversity receiver.

FIG. 10B illustrates a combiner 710 implementing equal gain combining, where signals $y_1$-$y_n$ on multiple branches are mixed by mixers 1052a-1052n with channel estimates $e^{-j\Theta_1}$-$e^{-j\Theta_N}$ to produce signals $r_1$-$r_n$. The signals $r_1$-$r_n$ are combined by a summer 1054. Here, $\Theta_k$ is the phase of component $h_k$, meaning:

$$h_k = |h_k| e^{j\Theta_k}. \quad (27)$$

The output of the mixer on the $k^{th}$ branch can be expressed as:

$$r_k = \sum_{k=1}^{N} |h_k| \cdot x + \sum_{k=1}^{N} (e^{-j\Theta_k} \cdot n_k). \quad (28)$$

The output of the combiner 710 can be expressed as:

$$r = |h_k| \cdot x + e^{-j\Theta_k} \cdot n_k. \quad (29)$$

The SNR of the combiner 710 can be expressed as:

$$\gamma = \frac{1}{N} \left[\sum_{k=1}^{N} |h_k|\right]^2 \cdot \gamma_0. \quad (30)$$

Figure 11A:
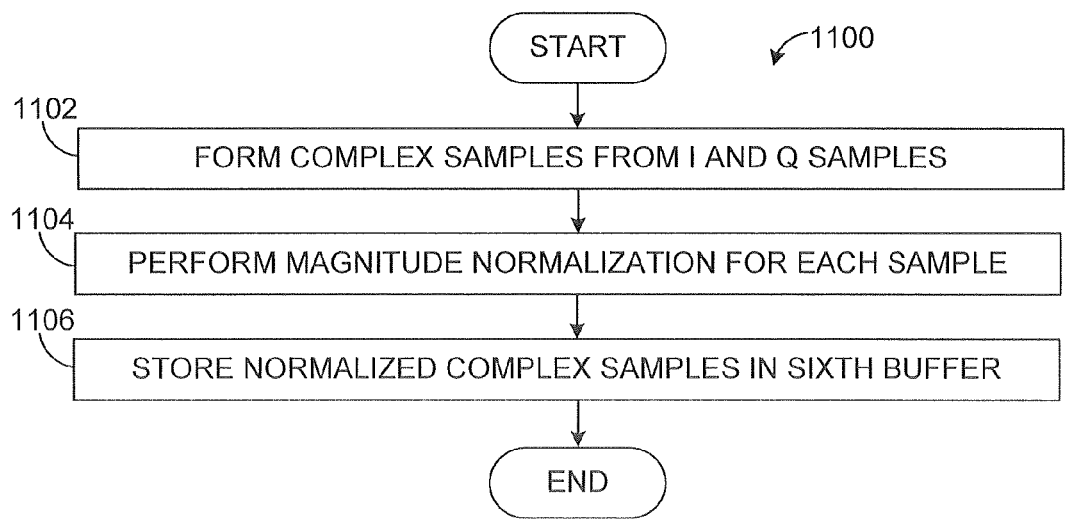
Figure 11B:
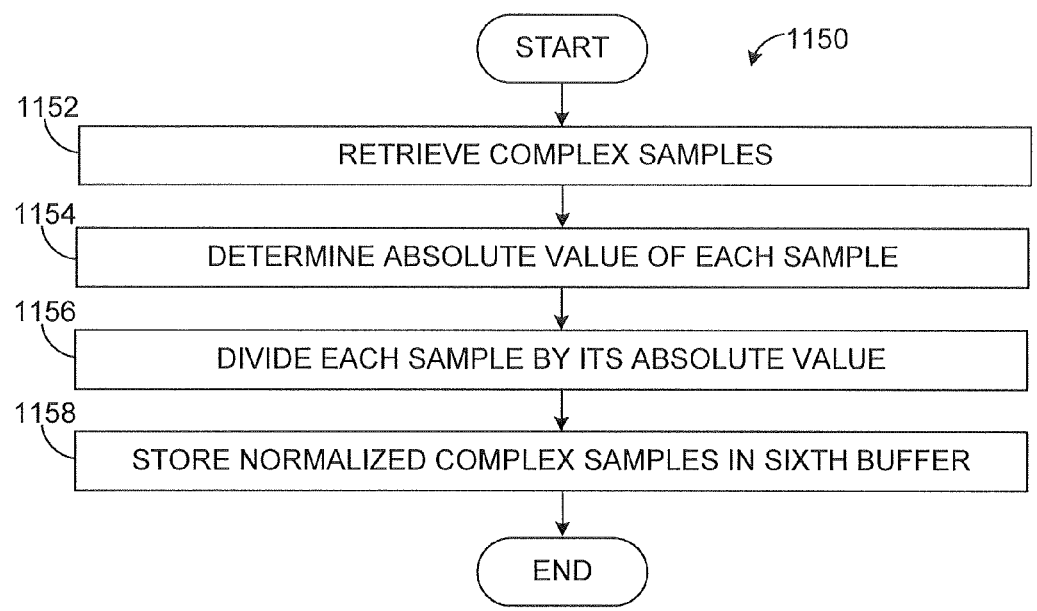

FIGS. 11A and 11B illustrate example methods 1100 and 1150 for performing limiting operations, which could be performed by the limiter 714 from FIG. 7B. In some embodiments, received GFSK or other signals undergo time-varying channel distortion, while some demodulators may need a constant-amplitude signal for proper demodulation. This can be achieved by normalizing the magnitude of a signal using the limiter 714. As shown in FIG. 11A, the limiter 714 generates complex samples using I and Q samples at step 1102. This could include, for example, generating complex samples Z defined as Z=I+jQ, where the I and Q samples are retrieved from the fourth and fifth buffers described above. The limiter 714 performs magnitude normalization for each sample at step 1104. This could include, for example, the limiter 714 determining the value of Z/|Z| for each complex sample. The normalized samples are stored in a sixth buffer at step 1106.

Alternatively, complex samples may have been generated and stored by another component. In that case, as shown in FIG. 11B, the limiter 714 retrieves complex samples at step 1152, and the limiter 714 determines the absolute value of each complex sample at step 1154. The limiter 714 divides each sample by its absolute value at step 1156 to produce normalized samples, and the normalized samples are stored in a sixth buffer at step 1158.

In particular embodiments, the limiter 714 receives signals expressed as:

$$s_{cmplx\_base}(n) = a(n) \cdot \{e^{j(\phi_{GFSK}(n))}\} \quad (31)$$

and produces signals expressed as:

$$S_{out}(n) = \frac{S_{cmplx\_base}(n)}{|S_{cmplx\_base}(n)|} = \frac{a(n) \cdot e^{j\varphi_{GFSK}(n)}}{|a(n) \cdot e^{j\varphi_{GFSK}(n)}|} = e^{j\varphi_{GFSK}(n)}. \quad (32)$$

Figure 12A:
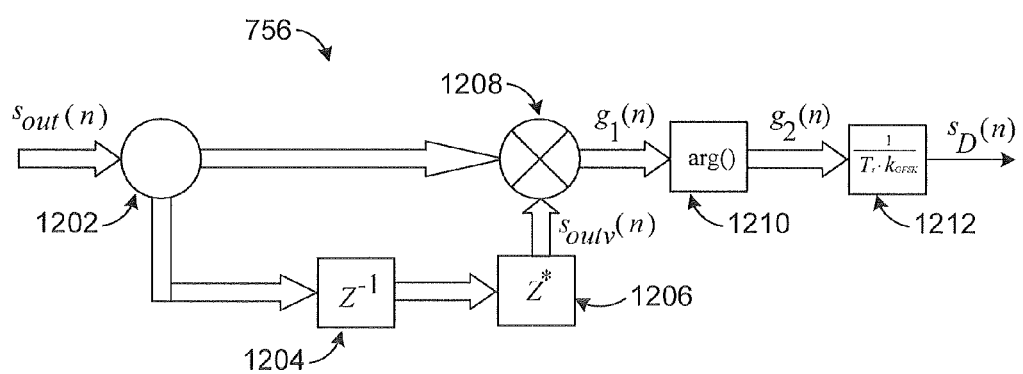
Figure 12B:
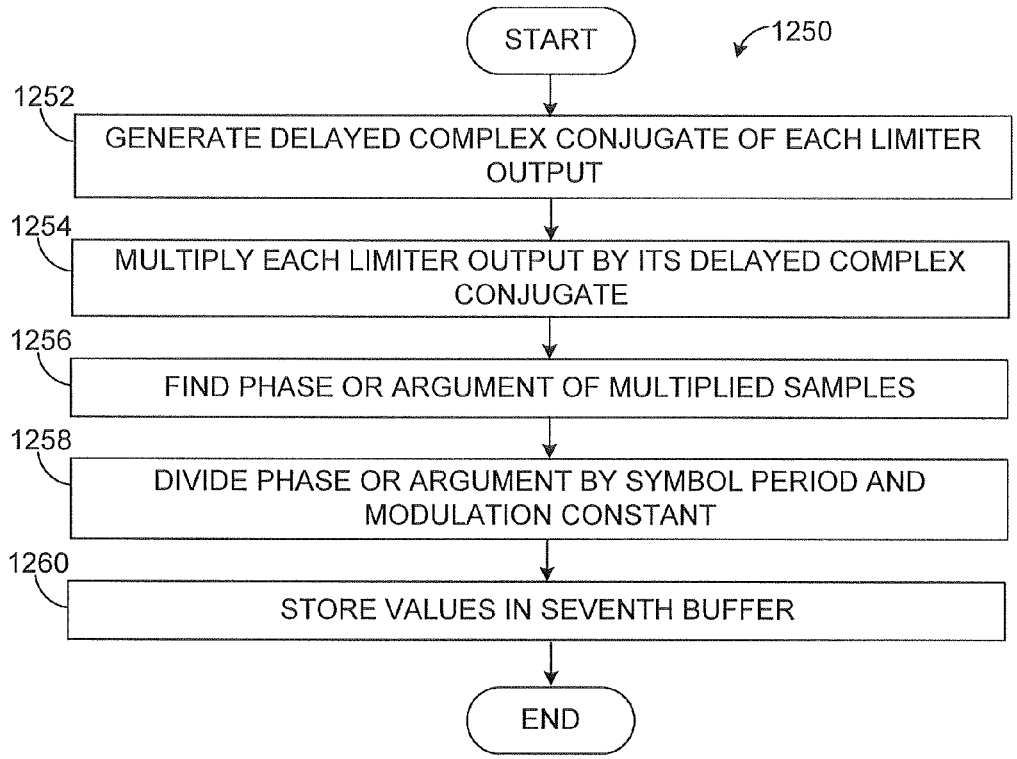

FIGS. 12A and 12B illustrate an example discriminator 716 from FIG. 7B and example discrimination operations. The discriminator 716 in this example is implemented as a baseband delay demodulator. The discriminator 716 receives an input signal $s_{OUT}(n)$ containing samples representing the combined baseband signals, and a splitter 1202 provides multiple copies of the samples. One copy of the samples is processed by two transform functions 1204-1206 to produce a signal $s_{OUTV}(n)$. The transform functions 1204-1206 delay and form a complex conjugate of the samples in the input signal $s_{OUT}(n)$. The signal $s_{OUTV}(n)$ is mixed with the input signal $s_{OUT}(n)$ by a mixer 1208 to produce a signal $g_1(n)$. A function block 1210 determines a phase or other argument of the signal $g_1(n)$ to produce a signal $g_2(n)$. The signal $g_2(n)$ is multiplied by a value $(1/T_s k_{GFSK})$ in a multiplier 1212 to produce a final output signal $s_D(n)$. Here, $T_s$ denotes the symbol period, and $k_{GFSK}$ denotes the GFSK modulation constant.

FIG. 12B illustrates an example method 1250 for performing discrimination operations, which could be performed by the discriminator 716. The discriminator 716 generates a delayed complex conjugate of each sample output by the limiter 714 at step 1252. Each sample from the limiter 714 is multiplied by its delayed complex conjugate at step 1254. The phase or other argument associated with the multiplied samples is determined at step 1256, and each argument value is divided by a product of the symbol period and modulation constant at step 1258. The resulting values are stored in a seventh buffer at step 1260.

In particular embodiments, the signal $g_1(n)$ can be expressed as:

$$g_1(n) = s_{out}(n)^* s_{outv}(n) = e^{j\phi_{GFSK}(n)} * e^{-j\phi_{GFSK}(n-1)} = e^{j(\phi_{GFSK}(n) - \phi_{GFSK}(n-1))}. \quad (33)$$

The signal $g_2(n)$ can be expressed as:

$$g_2(n) = \arg(g_1(n)) = \phi_{GFSK}(n) - \phi_{GFSK}(n-1). \quad (34)$$

The signal $s_D(n)$ can be expressed as:

$$S_D(n) = \frac{g_2(n)}{T_s \cdot k_{GFSK}} = \qquad (35)$$

$$\frac{\varphi_{GFSK}(n) - \varphi_{GFSK}(n-1)}{T_s \cdot k_{GFSK}} = \frac{\varphi'_{GFSK}(n)}{k_{GFSK}} = \frac{k_{GFSK} \cdot s_N(n)}{k_{GFSK}} = s_M(n).$$

Figure 13:
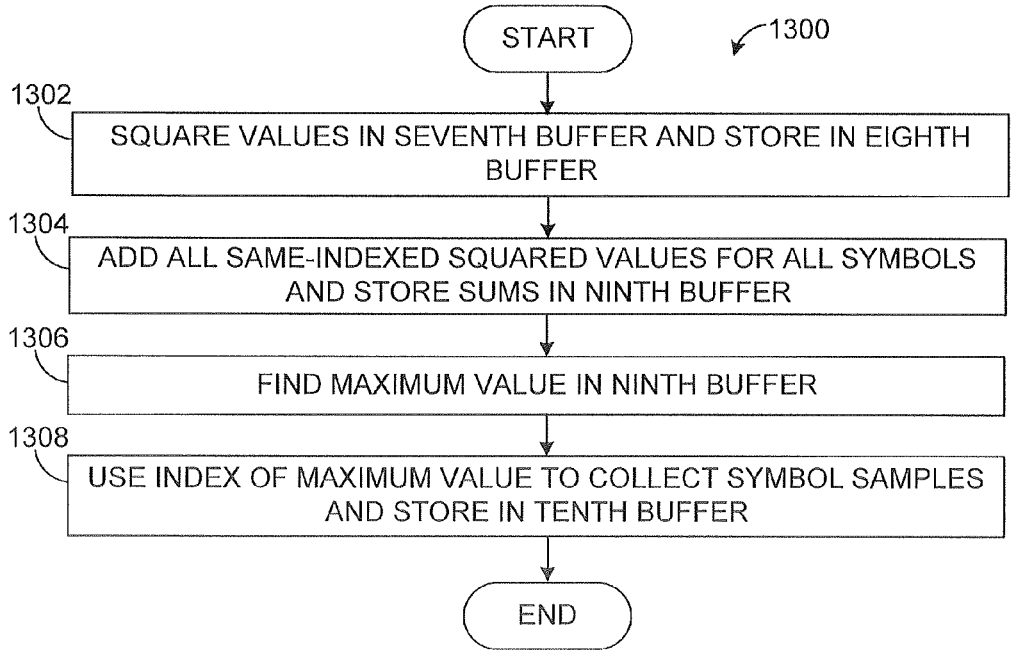

FIG. 13 illustrates an example method 1300 for timing recovery, which could be performed by the time synchronization unit 718 from FIG. 7B. This can be done to achieve symbol synchronization with an incoming signal. Two values may be determined to support timing recovery: sampling frequency and sampling phase. Determining the sampling frequency can involve estimating the symbol period so samples can be taken at the correct rate and the quantity of samples can be known (meaning the transmitter's symbol rate is known). Determining the sampling phase can involve determining the correct time within a symbol period to take a sample. For example, a symbol may be sampled at the center of the symbol period (at its peak), which may result in the best signal-to-noise ratio and may ideally eliminate inter-symbol interference.

As shown in FIG. 13, the time synchronization unit 718 squares all values from the seventh buffer and stores the squared values in an eighth buffer at step 1302. The time synchronization unit 718 sums the same-indexed squared values for multiple symbols over a specified duration and stores the sums in a ninth buffer at step 1304. The time synchronization unit 718 determines the maximum value in the ninth buffer (and its index) at step 1306. Using that index, the time synchronization unit 718 stores all symbol samples having that index in a tenth buffer at step 1308, which effectively decimates the symbol samples. The amplitudes of the selected samples in the tenth buffer can be used for data detection.

Figure 14:
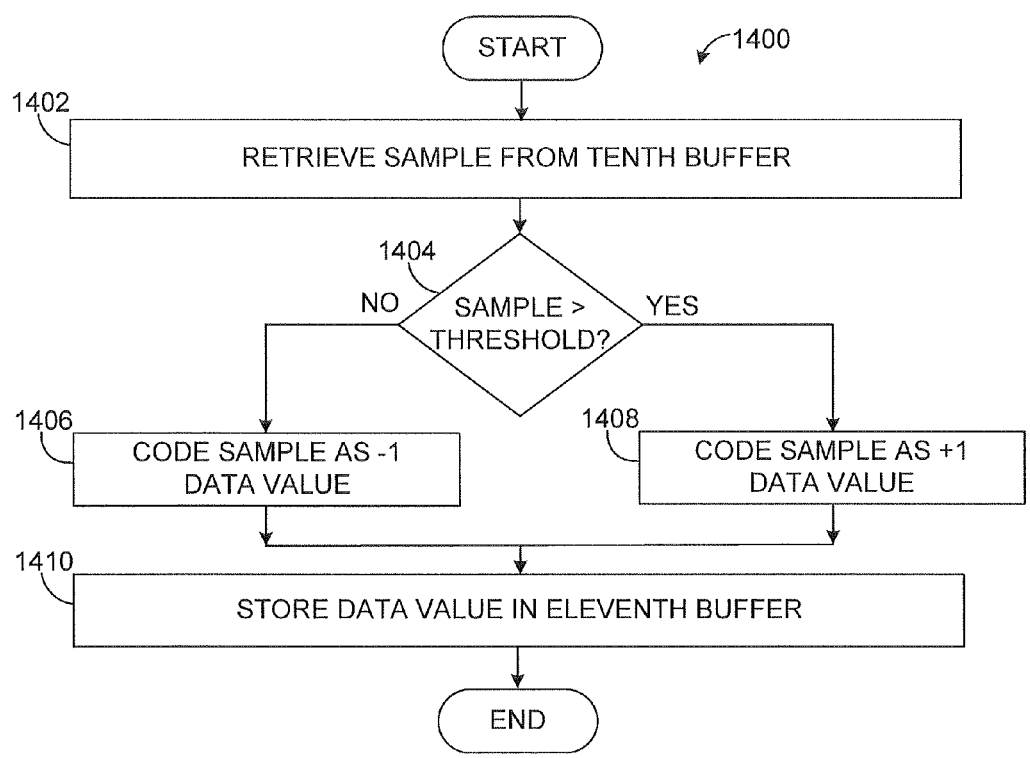

FIG. 14 illustrates an example method 1400 for data detection, which could be performed by the data detection unit 724 from FIG. 7B. The data detection unit 724 operates to detect or recover data from a signal, such as by determining whether each sample of data represents a +1 or a −1 data value. As shown in FIG. 14, a sample is retrieved from the tenth buffer at step 1402, and the sample's value is compared against a threshold value at step 1404. The threshold value could be determined by the threshold adjust unit 722. If the sample value is not greater than the threshold, the sample is coded as a −1 data value at step 1406. Otherwise, the sample is coded as a +1 data value at step 1408. The data value is stored in an eleventh buffer at step 1410. This process could be repeated for each sample in the tenth buffer.

Figure 15:
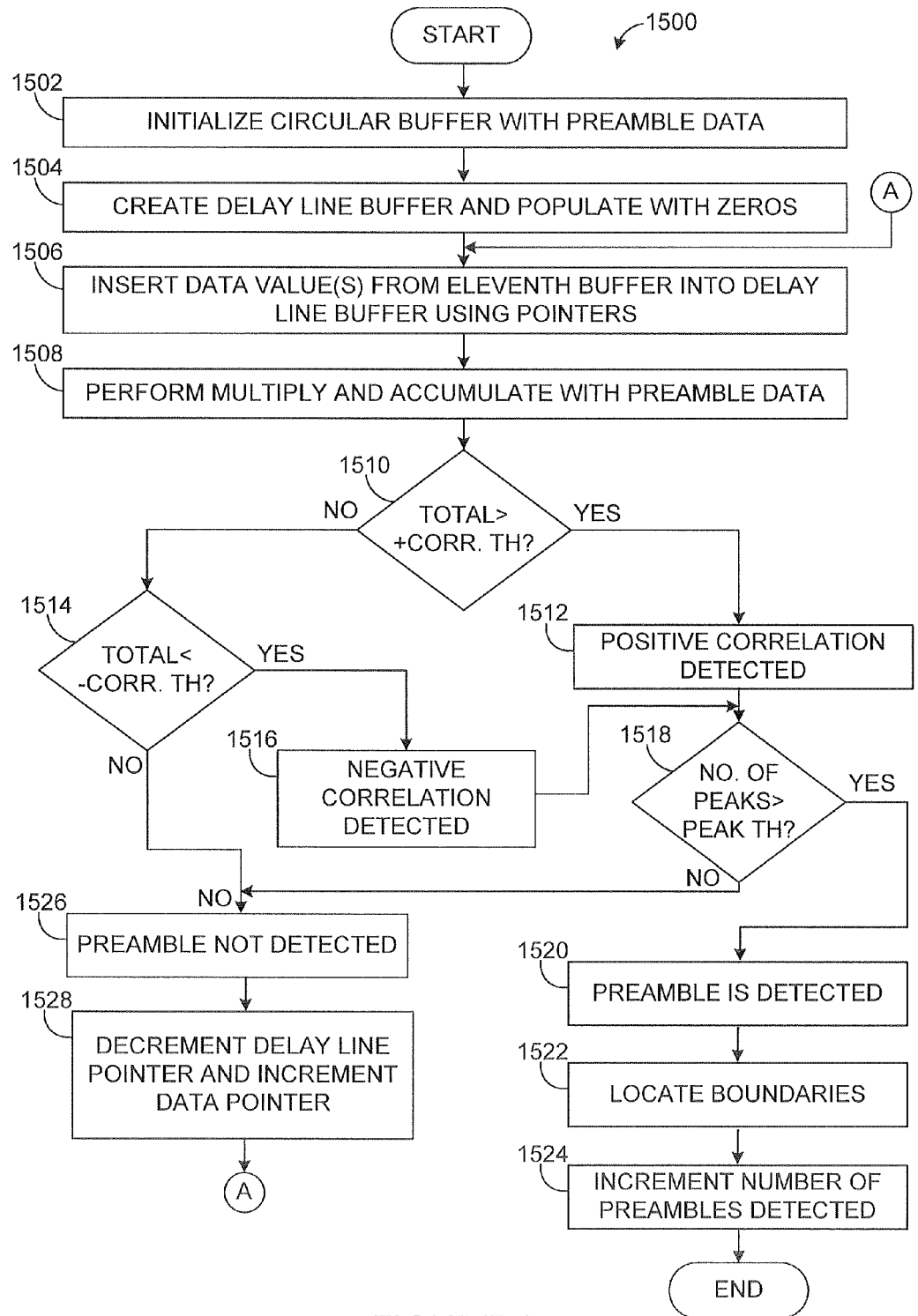

FIG. 15 illustrates an example method 1500 for preamble detection, which could be performed by the preamble detection unit 728 from FIG. 7B. The preamble detection unit 728 operates to detect a preamble in a digital stream. In particular embodiments, the preamble detection unit 728 may use a symmetric sliding-window cross-correlation method to estimate time-varying correlations between signals. This method produces a correlation value (positive or negative) between two signals for every time and lag pair of values. In general, a diversity receiver may wait to detect a preamble in a wireless signal before attempting to extract a payload from a possible frame.

As shown in FIG. 15, the preamble detection unit 728 initializes a circular buffer and stores preamble data defining the expected preamble at step 1502. The preamble detection unit 728 creates a delay line buffer and populates the delay line buffer with zeros at step 1504. Both buffers could be created in the memory 204 or other location(s).

The preamble detection unit 728 inserts one or more data values from the eleventh buffer into the delay line buffer at step 1506. The data values could be selected from the eleventh buffer using a data pointer, and the location of insertion into the delay line buffer could be identified using a delay line pointer. One data value could be inserted into the delay line buffer during the first iteration, or the delay line buffer could be filled with data values during the first iteration.

A multiply and accumulate operation is performed at step 1508. This could include, for example, the preamble detection unit 728 multiplying each data value in the delay line buffer with the corresponding preamble value in the circular buffer and summing the multiplication results to produce a total.

A decision is made whether the total exceeds a positive correlation threshold (+CORR. TH) at step 1510. If so, a positive correlation is detected at step 1512. Otherwise, a decision is made whether the total falls below a negative correlation threshold (−CORR. TH) at step 1514. If so, a negative correlation is detected at step 1516. If either a positive or negative correlation is detected, the preamble detection unit 728 determines whether a number of detected peaks associated with the incoming signal is above a peak threshold (PEAK TH) at step 1518. If so, a preamble is detected at step 1520, boundaries are located at step 1522, and the number of preambles detected is incremented at step 1524. The located boundaries may include the start of a frame, the end of the preamble, and the start of unknown data or data after the preamble.

If neither positive nor negative correlation is detected or the number of detected peaks does not exceed the peak threshold, a preamble is not detected at step 1526. In that case, the delay line pointer is decremented and the data pointer is incremented at step 1528, and the process returns to step 1506 to insert another data value from the eleventh buffer into the delay line buffer. During each of these subsequent iterations, a single data value from the eleventh buffer could be inserted into the delay line buffer.

Figure 16:
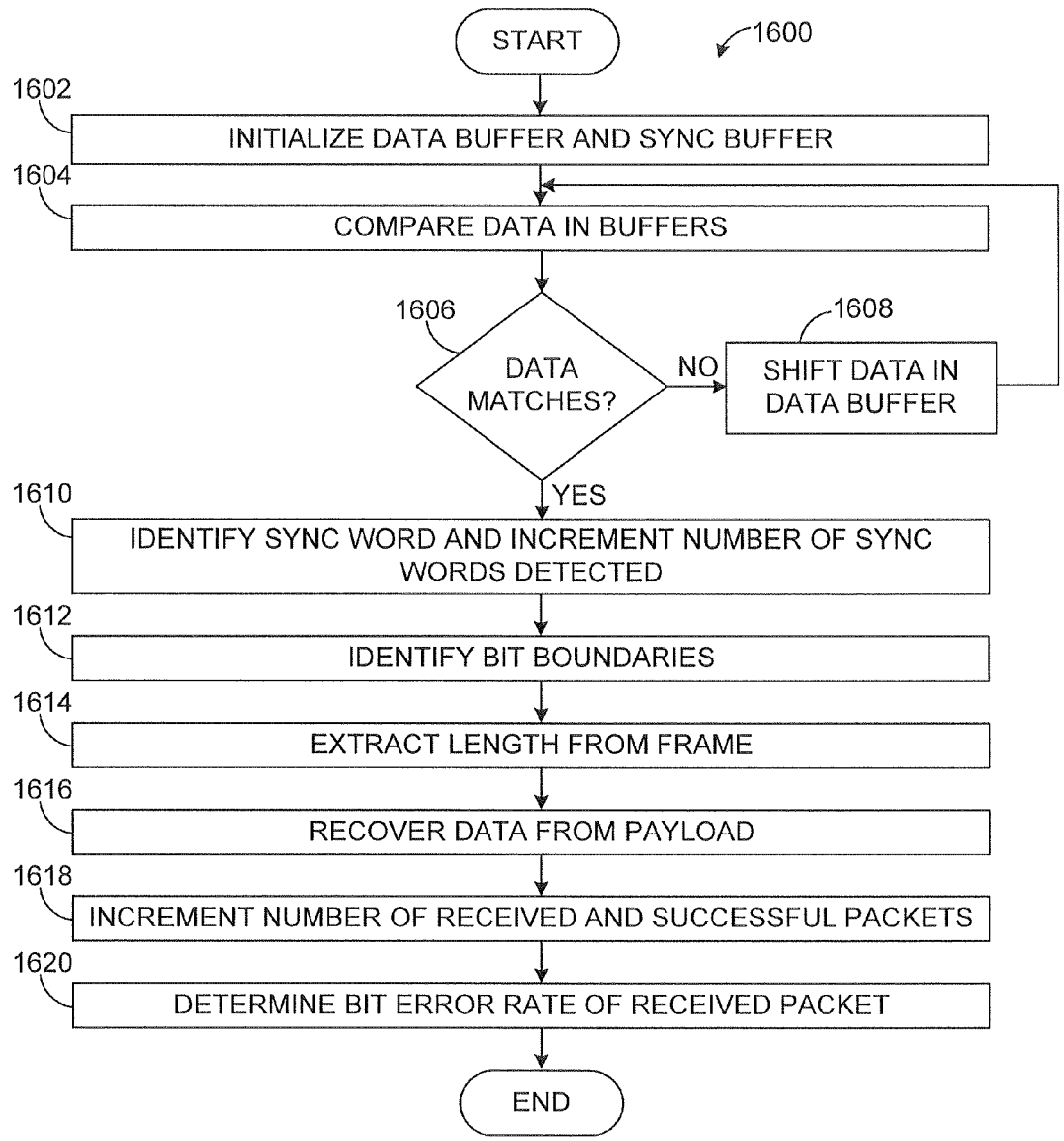

FIG. 16 illustrates an example method 1600 for sync word detection and payload extraction, which could be performed by the sync word detection unit 730 and the payload extraction unit 732 from FIG. 7B. The sync word detection unit 730 initializes a data buffer and a sync buffer at step 1602. The data buffer could hold the data values provided by the data detection unit 724, and the sync buffer could hold the expected sync word. The sync word detection unit 730 compares the data in the buffers at step 1604, such as by performing a bit-by-bit comparison of the values in the buffers. A determination is made whether the data matches at step 1606. If not, the data in the data buffer is shifted (such as to the right by one bit) at step 1608, and the process returns to step 1604.

Otherwise, a sync word is identified in the data buffer and the number of detected sync words is incremented at step 1610. The bit boundaries are noted at step 1612, which could include identifying the different fields of the frame 750. The length of the payload data is extracted from the frame at step 1614, and data is recovered from the payload section of the frame using the length to produce a recovered packet at step 1616. The number of received packets and the number of successful packets are incremented at step 1618, and a bit error rate associated with the recovered packet is determined at step 1620.

Note that additional steps may occur between steps 1616 and 1618. For example, a received test frame could contain known payload data. In this case, before determining that a packet is received successfully, the payload extraction unit 732 can compare the data recovered from the payload section of the test frame to the expected payload data. If necessary, the payload extraction unit 732 can shift the data in the data buffer one or more times (such as to the right one bit) in an attempt to locate the expected payload data in the received test frame. Only when the expected payload data is located would a test packet be counted as successful. Otherwise, the packet may be counted as received without being counted as successful.

Figure 17:
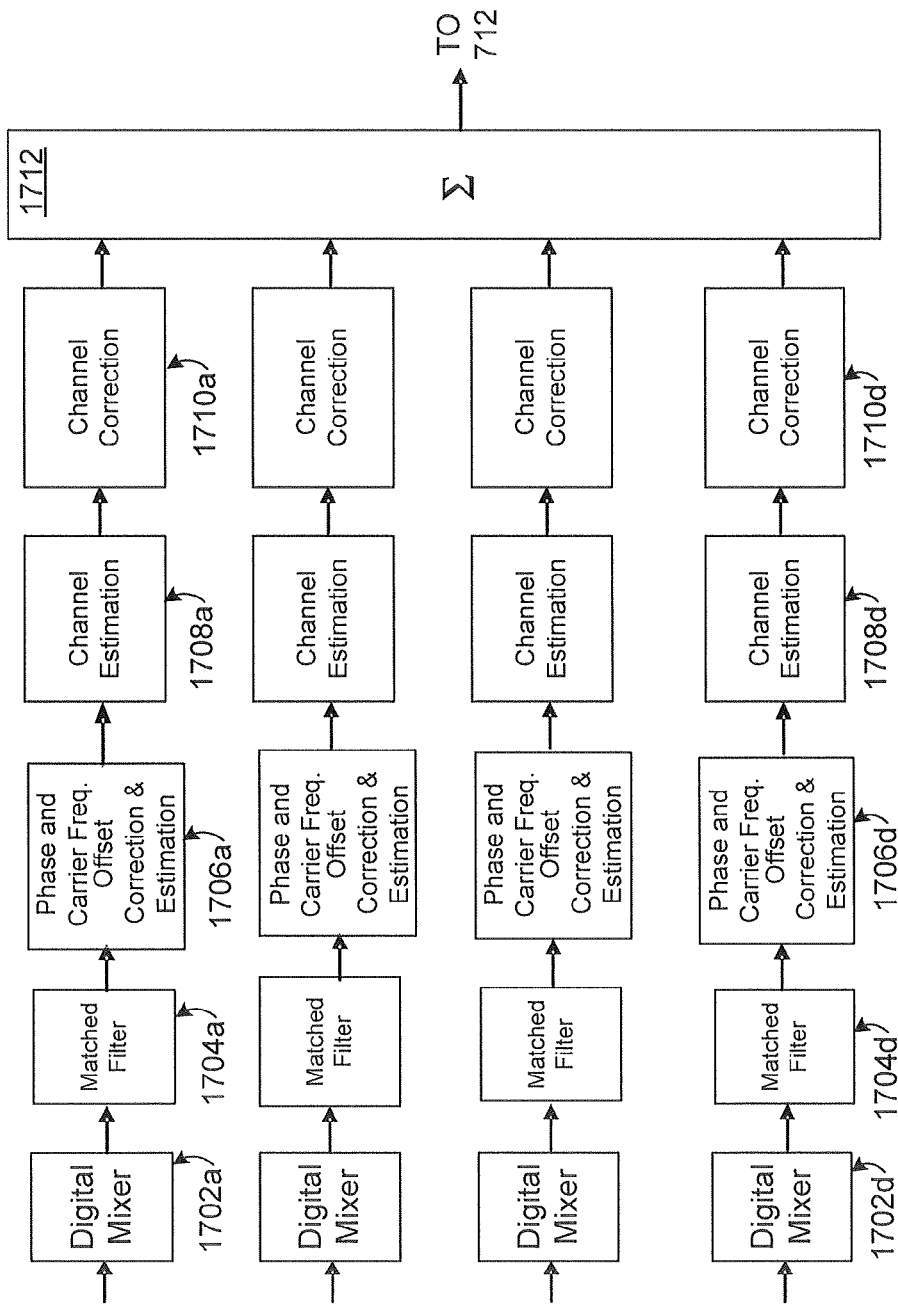

FIG. 17 illustrates another example embodiment of the processing unit 414, 514. In this example, outputs from the analog-to-digital converter 412, 508 are provided to digital mixers 1702a-1702d, which perform mixing to down-convert the received signals. The down-converted signals are then filtered using matched filters 1704a-1704d, and the filtered signals undergo phase and carrier frequency estimation and correction in units 1706a-1706d. After that, channel estimation units 1708a-1708d estimate the channel coefficients, and channel correction units 1710a-1710d can perform additional corrections of the channels. A combiner 1712 then combines the signals, and the combined baseband signals are provided to the demodulator 712 in FIG. 7B for further processing.

Note that the architectures shown in FIGS. 7A and 17 use pre-detection diversity combining, meaning that the diversity combining occurs before detection of the data and synchronization to the frames. FIGS. 18A through 18E illustrate an example embodiment of a processing unit 414, 514 that uses post-detection diversity combining. Here, the diversity combining occurs after the detection of data and synchronization to the frames of data.

Figure 18A:
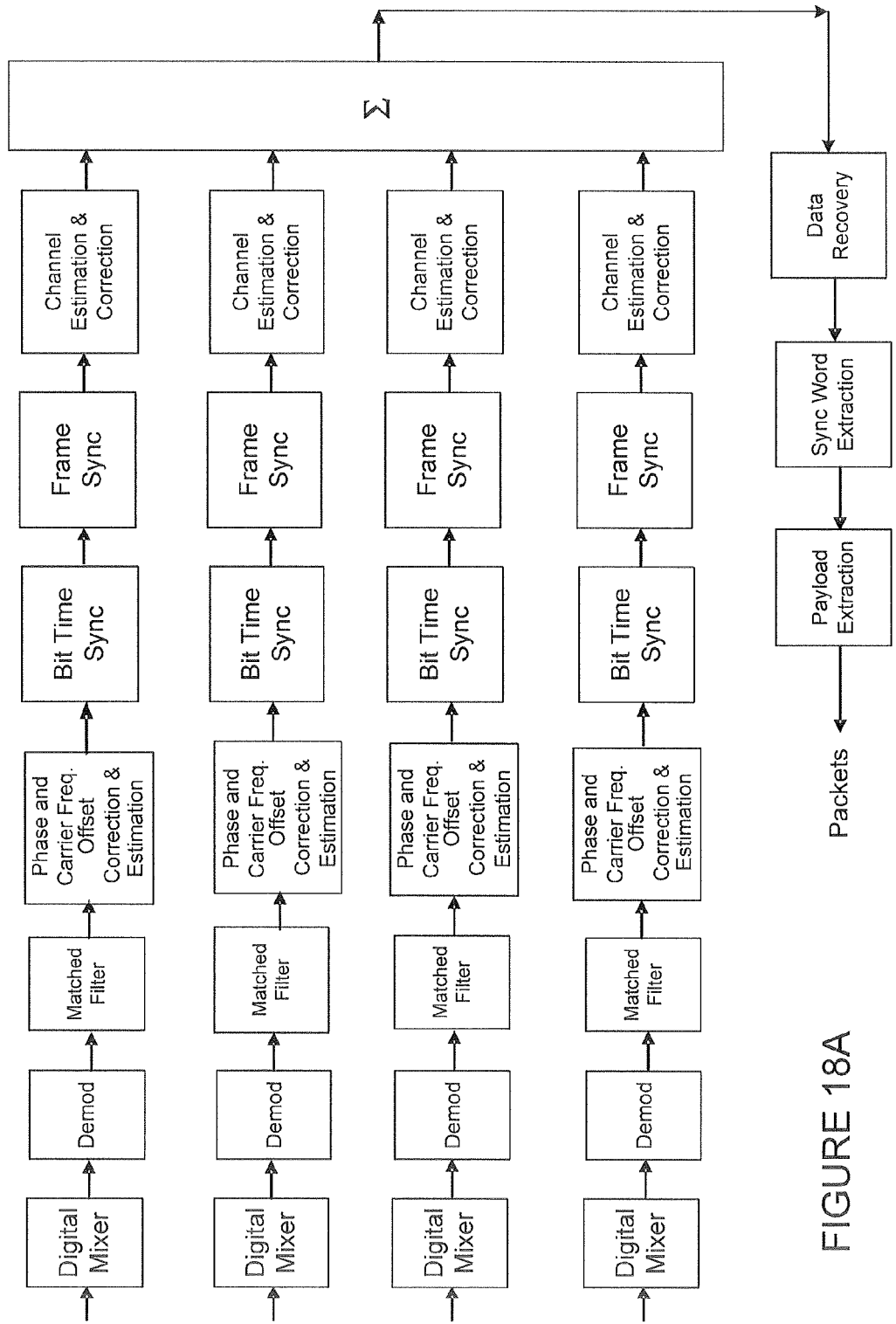

The structure shown in FIG. 18A is similar to the structures shown in FIGS. 7A and 17, but the components have been rearranged. Here, demodulation of each baseband signal occurs after digital mixing, and bit time synchronization and frame synchronization occur prior to channel estimation and correction.

Figure 18B:
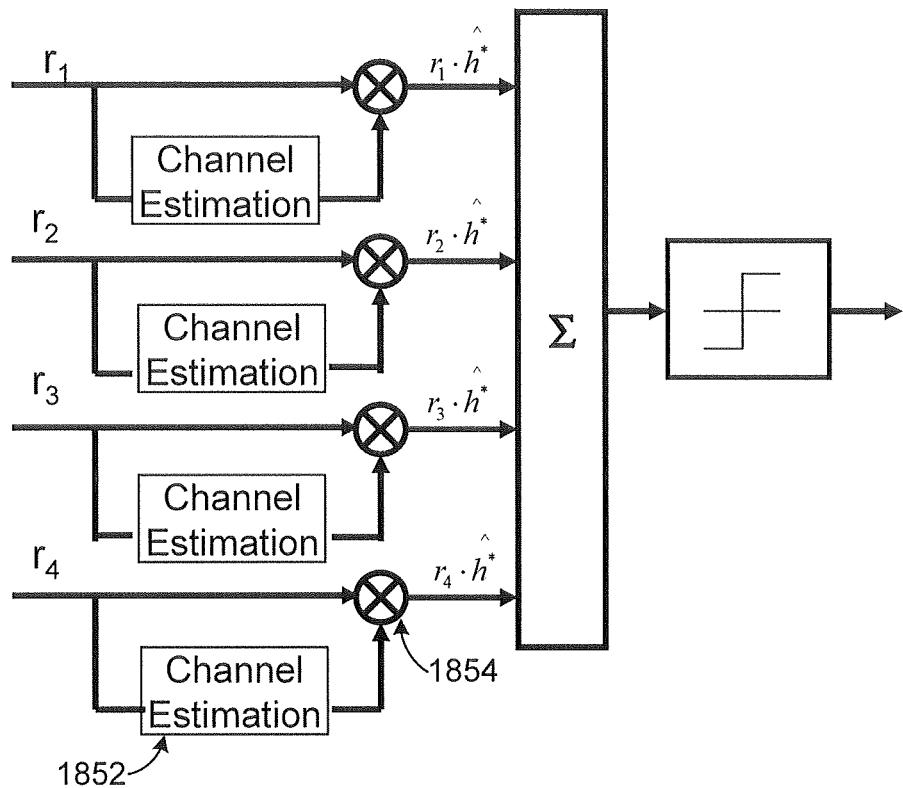

FIG. 18B illustrates an example implementation of the channel estimation and correction units from FIG. 18A. In this example, each channel estimation and correction unit includes a channel estimator 1852 and a multiplier 1854 implementing an equalization function. Because frame synchronization has already occurred, the preambles of the frames are known when the frames are received by the channel estimators 1852. The signals received by the channel estimators 1852 could be expressed as:

$$y_j = b_j * h_j + n_j. \quad (36)$$

A channel estimate for the preamble portion of each frame (defined as bits $0\text{-}N_{p-1}$) could be expressed as:

$$\hat{h}_j = \frac{b_j^* \cdot y_j}{\|b_j\|^2}. \quad (37)$$

Here, each preamble is multiplied by its complex conjugate, and the product is divided by the second norm of the complex conjugate (or the second norm of the preamble). In particular embodiments, each preamble is stored in one look-up table, the complex conjugates are stored in another look-up table, and the channel estimates are stored in a buffer.

To identify a channel estimate for the data portion of each frame (the data after the preamble defined as bits $N_p\text{-}N_{d-1}$), the channel estimates of the preamble portions can be averaged using an $N_{MA}$-length Moving Averaging (MA) filter. The average can be expressed as:

$$\hat{h}_j = \frac{1}{N_{MA}} \sum_{i=0}^{N_{MA}-1} \hat{h}_{j-i} \quad (38)$$

where:

$$j \in [N_P, N_P + N_d - 1]. \quad (39)$$

Here, the next channel coefficient for unknown data can be estimated from the moving averages. As a particular example, a straight line can be fit in a complex plane (signal space) to the points of the preamble channel estimates, and linear interpolation can be used to determine channel estimates for the unknown data portions. The multipliers 1854 in FIG. 18B multiply the complex conjugate of each channel estimate for the unknown data portions by the actual received signals to provide equalization.

Figure 18C:
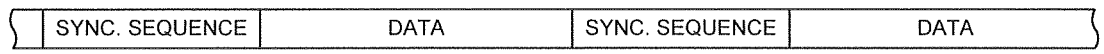

In order to support the use of post-detection combining, a synchronization sequence can be inserted repeatedly or periodically into a transmitted stream as shown in FIG. 18C. The synchronization sequence could, for example, represent a known unique sequence of 32 bits. The synchronization sequence can be used to align the baseband signals in the channels prior to diversity combination, which can help to provide up to a 3 db improvement or more in the signal-to-noise ratio.

In some embodiments, the frame synchronization units in FIG. 18A can synchronize to both the start of frames and the start of superframes (where each superframe includes multiple frames). Also, elastic buffers can be used to store samples of the baseband signals, and the elastic buffers can be used to remove the differential delays in the various baseband signals. In addition, the diversity combiner in FIG. 18A can sum synchronized baseband signals using adaptively-controlled coefficients to provide a desired quality of service.

Figure 18D:
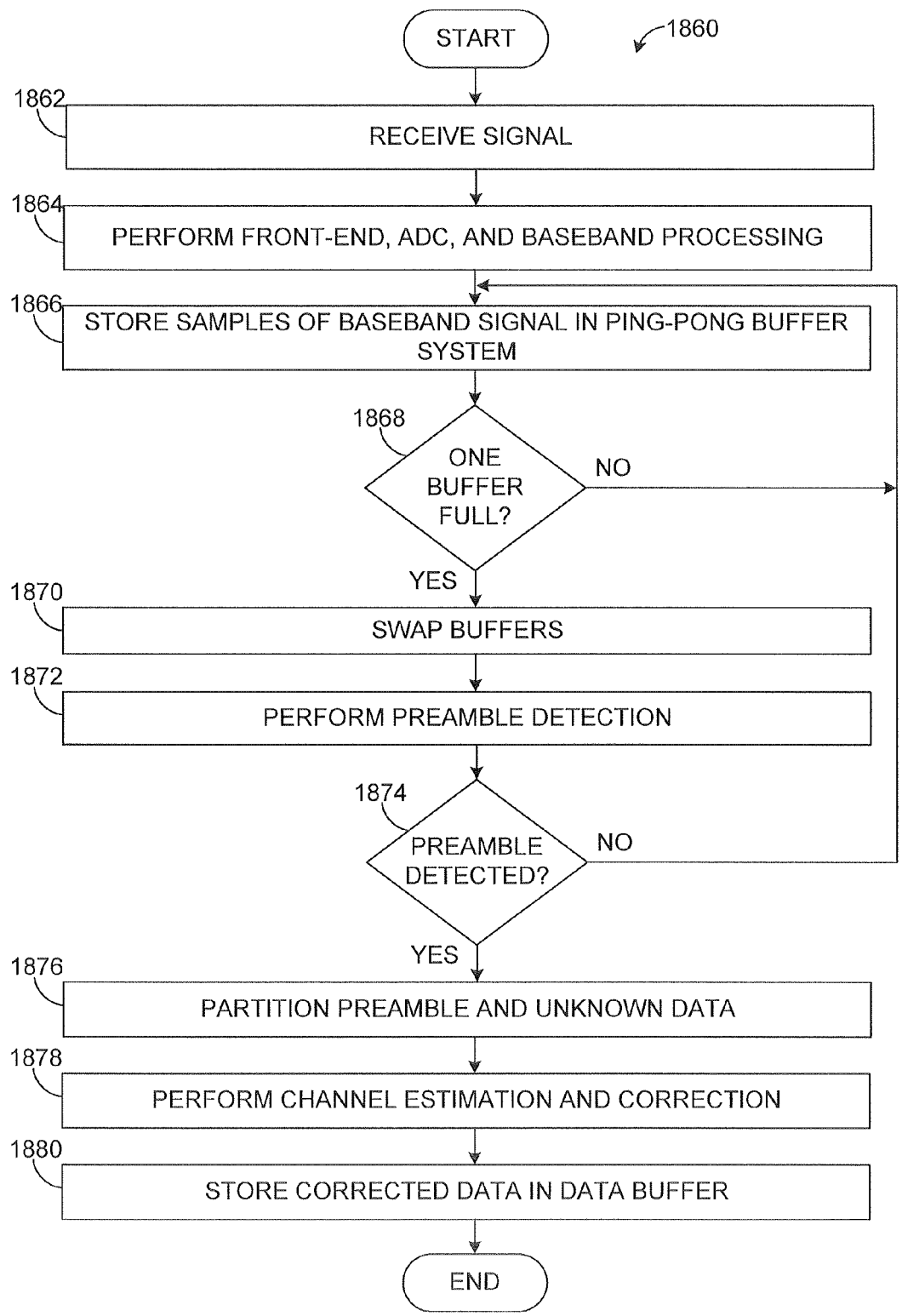
Figure 18E:
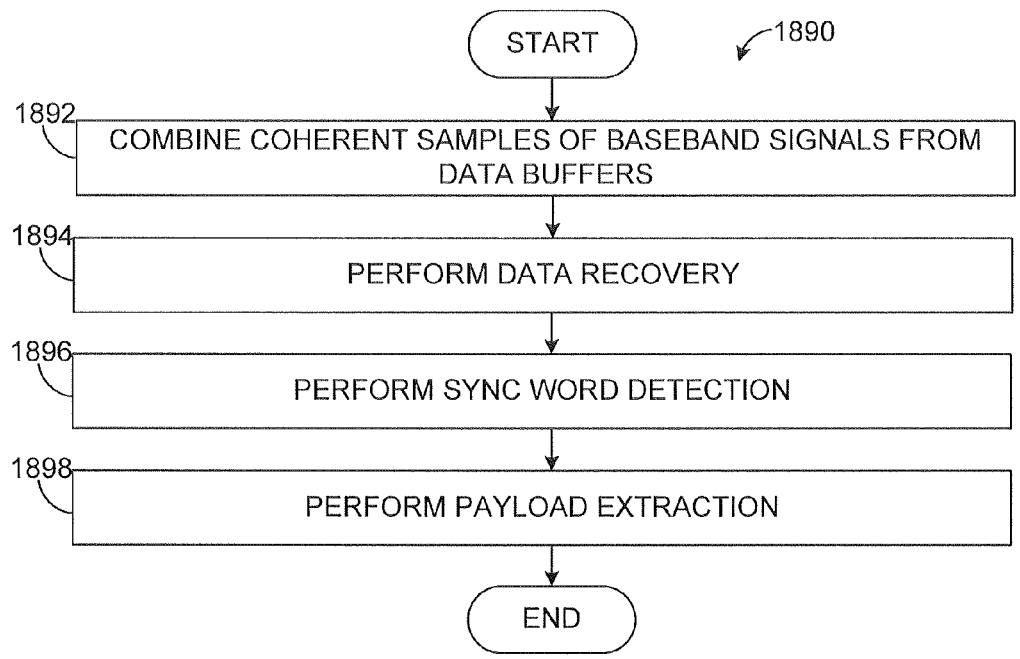

FIGS. 18D and 18E illustrate example operations of the processing unit 414, 514 implemented as shown in FIG. 18A. In particular, FIG. 18D illustrates the processing performed in each finger of the processing unit 414, 514 prior to diversity combination, and FIG. 18E illustrates the processing performed during and after diversity combination.

As shown in FIG. 18D, a method 1860 includes receiving a signal at step 1862 and performing initial processing at step 1864. The initial processing can include front-end processing, analog-to-digital conversion, and baseband processing (such as mixing, demodulation, filtering, and phase/carrier offset estimation and correction). Samples of the baseband signal are stored in a ping-pong buffer system at step 1866. A ping-pong buffer system typically includes a controller and two buffers, where one buffer is filled after the other buffer is full. If one of the buffers is filled by the new samples at step 1868, the buffers are swapped at step 1870, and preamble detection occurs using the samples in the filled buffer at step 1872. If a preamble is detected at step 1874, the preamble is partitioned or otherwise distinguished from the unknown data following the preamble at step 1876. Channel estimation and correction occur at step 1878, and corrected samples are stored in a data buffer at step 1880. Note that this method 1860 can be performed by each finger in FIG. 18A to fill multiple data buffers with generally coherent samples of different baseband signals.

As shown in FIG. 18E, a method 1890 includes combining the coherent samples from the data buffers of the multiple fingers at step 1892. Data recovery is then performed using the combined samples at step 1894, sync word detection occurs at step 1896, and payload extraction occurs at step 1898.

Figure 19B:
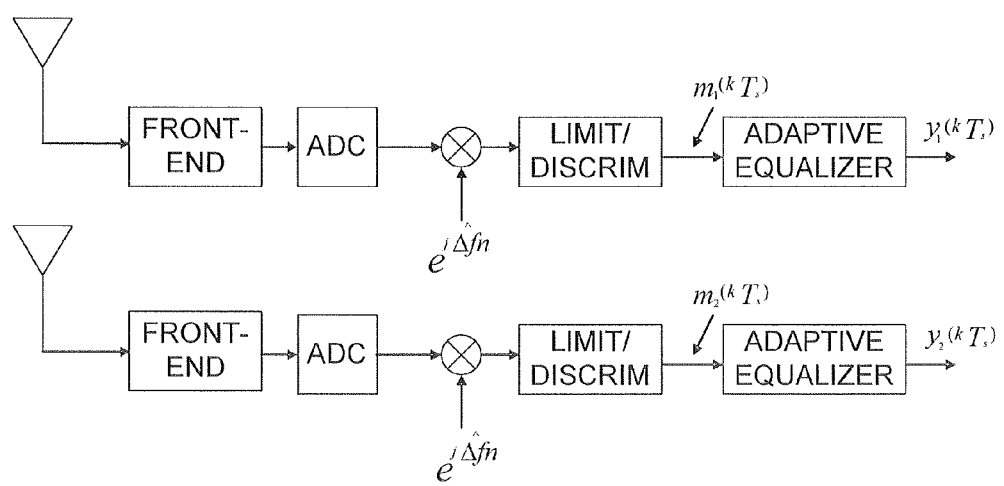
Figure 19A:
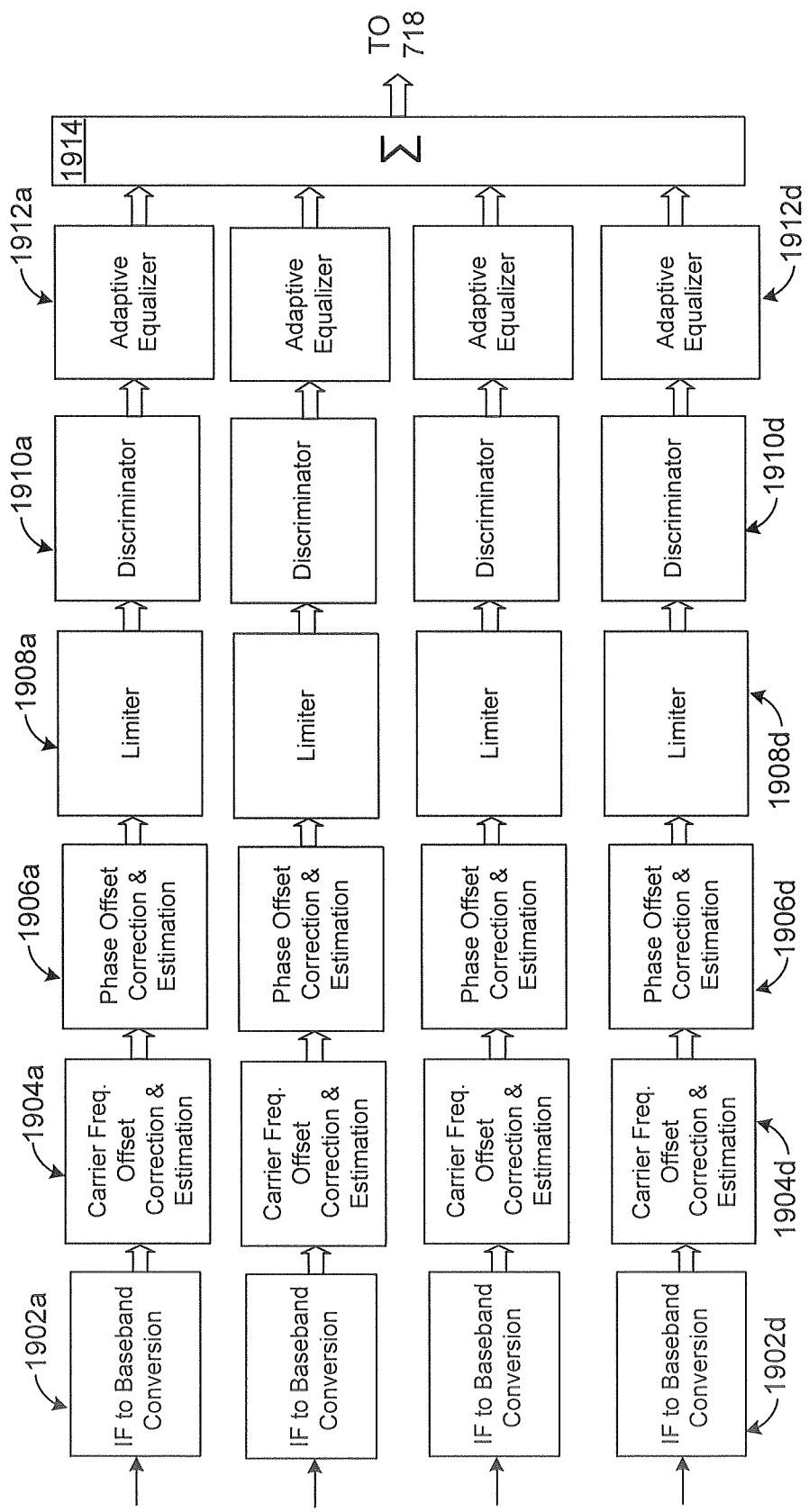

FIGS. 19A and 19B illustrate another example embodiment of the processing unit 414, 514 in a diversity receiver. In this embodiment, the diversity receiver supports an equalizer-based architecture. Here, the processing unit 414, 514 includes four intermediate frequency to baseband conversion units 1902a-1902d, four carrier frequency offset correction and estimation units 1904a-1904d, and four phase offset correction and estimation units 1906a-1906d. These components may be the same as or similar to the corresponding components in FIG. 7A. The processing unit 414, 514 also includes four limiters 1908a-1908d and four discriminators 1910a-1910d, which could be the same as or similar to the corresponding components in FIG. 7B (except the components here process baseband signals prior to combination).

The processing unit 414, 514 further includes four adaptive equalizers 1912a-1912d. The adaptive equalizers 1912a-1912d generally provide adaptive filtering that adapts to the time-varying characteristics of wireless communication channels. Any suitable adaptive equalization technique could be supported by the adaptive equalizers 1912a-1912d. The equalized outputs are provided to a combiner 714, which implements diversity combining to produce combined baseband signals. The combined baseband signals are provided to the time synchronization unit 718 in FIG. 7B, and the components 718-732 in FIG. 7B can process the combined baseband signals (which were demodulated prior to combination). FIG. 19B illustrates example signals produced in an equalizer-based diversity receiver. In a specific example, the signals can be expressed as:

$$m_1(^kT_s) = I_k h_1(^{t-k}T_s) \quad (40)$$

$$m_2(^kT_s) = I_k h_2(^{t-k}T_s) \quad (41)$$

$$y_1(k) = I(k) + n_1(k) = \frac{1}{\sigma^2} \quad (42)$$

$$y_2(k) = I(k) + n_2(k) = \frac{1}{\sigma^2} \quad (43)$$

$$y_1(k) + y_2(k) = 2I(k) + \underbrace{n_1(k) + n_2(k)}_{2\sigma^2} \quad (44)$$

where the combined signal is denoted $y_1(k)+y_2(k)$.

The following describes specific implementations of components in a diversity receiver. For example, time synchronization could be performed using bit signal-level transitions. A buffer of demodulated samples could be available, and bits can be extracted from the buffer. A signal level transition from positive to negative could indicate a change of a bit from "1" to "0" and vice versa. From the transition period, an offset for half of a sampling factor can be identified, where the sampling factor is defined as the number of bits per sample. To extract bits from the buffer of demodulated samples, the time instant value defined by the offset can be used to determine when to sample bit values. The same process can be repeated for the next buffer of demodulated samples. Before sync word detection, the search for the transition position in demodulated samples can be carried out based on the last sample of the buffer. After sync word detection, the search for the transition position in demodulated samples can be carried out based on the first sample of the buffer. This can be done to avoid wrong time instant deduction in the presence of strong inter-packet noise. In particular embodiments, this approach can be implemented using a DSP.

Bit extraction can be performed as follows. If the current time instant deduced above is greater than the previous time instant by a specified amount (such as 20% or 80%), an extra bit can be extracted based on the previous time instant, and the remaining bits can be extracted from the buffer of demodulated samples based on the current time instant. If the previous time instant deduced is greater than the current time instant by a specified amount (such as 20% or 80%), the first bit can be ignored, and the remaining bits can be extracted from the buffer of demodulated samples based on the current time instant. If either of these conditions is not met, the bits are extracted from the buffer of demodulated samples based on the current time instant. This technique can help to reduce or eliminate the loss of a bit and the extraction of the same bit at a boundary between two buffers of demodulated samples. In particular embodiments, this approach can be implemented using a DSP.

Bit time synchronization and clock extraction can also be performed as follows. When implemented using multiple receive chains (multiple fingers), a counter and the sign bit of the sum of all of the input samples can be used. The counter could count from zero up to a number equal to the number of samples per bit of information at the demodulated output minus one, which can be expressed as ((sampling frequency/data rate)−1). The counter can be incremented for every sample received, and the counter can be reset whenever there is a change in the sign bit or when the counter counts up to the maximum value (sampling factor minus one). When the counter value exceeds a value expressed as (sampling frequency/2*data rate), an output clock can be made high, and the input sample at that instant is latched onto the output (this instant is ideally at or near the center point of the bit). Whenever the counter is reset, the output clock can be made low. The sign bit after inversion can be output as the demodulation bit value. This implementation is a simple, low cost circuit that may require only a counter, a one-bit buffer, and a few logic gates. Also, since samples are not buffered, this can avoid the need for buffer management and errors associated with buffering (such as bit missing and bit re-reading). In addition, this approach provides very low latency, adapts to data rate fluctuations, and is tolerant to persistent changes in the data rate. In particular embodiments, this approach can be implemented using an FPGA.

Note that each of the components shown in FIGS. 5 through 19B could represent any suitable structure for performing the described function(s) of that component. For example, various components could be implemented in hardware or implemented in software or firmware executed using suitable processing or other components. Also note that the functional division shown in the figures is for illustration only. Various components or steps in each figure could be combined, omitted, or further subdivided and additional components or steps could be added according to particular needs. Further note that various aspects of these figures, such as the number of baseband signals generated and combined, are for illustration only. In addition, features of one or more figures described above could be implemented in other figures described above.

A number of benefits can be obtained using these various approaches. For example, reconfigurable hardware and software-defined baseband can enable and support interoperability and coexistence among various wireless standards. Slot-based multi-standard radio configurations and communications can be supported, such as ISA-100 radio auto-configuration communications in one slot and wireless HART standard-configuration communications in a subsequent slot. Also, diversity combining can be used in process control applications such as industrial wireless sensor networks. Moreover, geometrical or spatial routing based on directional beams in harsh environments can improve system performance. An overall reduction in the system complexity and cost can be obtained by reducing the number of nodes required per network. Beyond that, it may be possible to obtain a guaranteed 3 dB or better gain, which could double the range of conventional radios. Further, reconfigurable hardware platforms (such as any wireless standard or system that gives a 2 MHz intermediate frequency) can be interfaced to a digital baseband system, and reconfigurable software baseband signal processing implementations (such as any wireless standard or system baseband signal processing algorithms) can be implemented and upgraded into the system. In addition, plug-and-play off-the-shelf RF or other front-end, ADC, and digital baseband boards can be used to reduce development life cycle and enable hassle-free upgrading of existing wireless sensor networks.

Figure 20A:
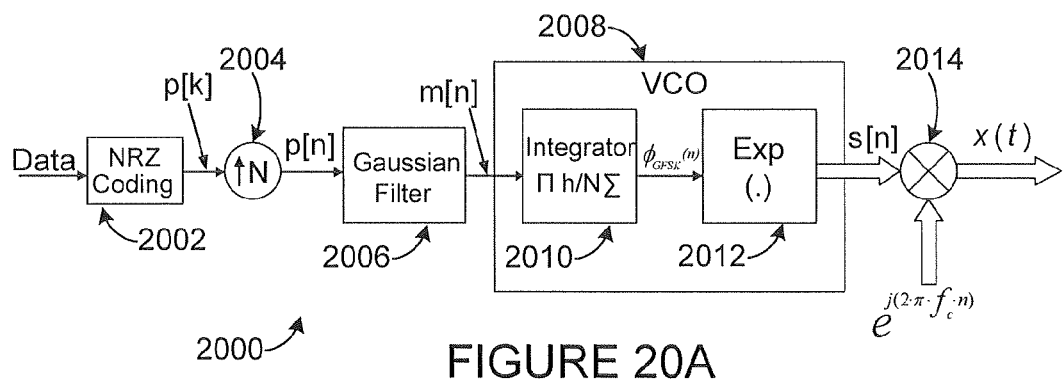
FIGS. 20A and 20B illustrate example transmitters for use in a wireless node of an industrial control and automation system according to this disclosure.
Figure 20B:
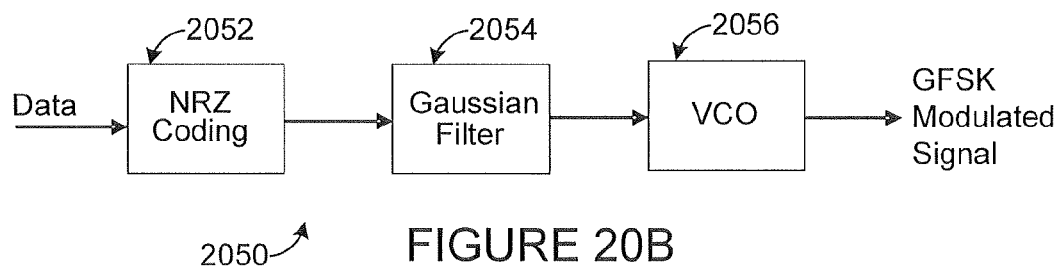

FIGS. 20A and 20B illustrate example transmitters 2000 and 2050 for use in a wireless node of an industrial control and automation system according to this disclosure. The transmitters 2000 and 2050 could, for example, be used within the transceiver 206 and/or 210 of an infrastructure node (gateway or other) or a leaf node.

As shown in FIG. 20A, a transmitter 2000 includes a non-return-to-zero (NRZ) encoder 2002, an up-converter 2004, and a Gaussian filter 2006. The encoder 2002 performs NRZ encoding of data to be transmitted, and the up-converter 2004 increases a sampling rate of the encoded data. The Gaussian filter 2006 reduces the speed of frequency transitions and avoids discontinuities in the transmitted signal. The output of the Gaussian filter 2006 is provided to a voltage-controlled oscillator (VCO) 2008, which includes an integrator 2010 and an exponential function unit 2012. The integrator 2010 integrates the signals from the filter 2006, and the exponential function unit 2012 applies an exponential function to the integrated data. The output of the function unit 2012 represents GFSK modulated data, which is mixed with other signals by a mixer 2014 to produce the transmitted wireless signals.

In particular embodiments, the coefficients of the Gaussian filter 2006 can be given by:

$$g(n) = \frac{1}{4\eta}\left[\text{erf}\left(\pi k_{BT}\sqrt{\frac{2}{\ln 2}}\left(\frac{n}{\eta}+\frac{1}{2}\right)\right) - \text{erf}\left(\pi k_{BT}\sqrt{\frac{2}{\ln 2}}\left(\frac{n}{\eta}-\frac{1}{2}\right)\right)\right] \quad (45)$$

where n is an integer, $\eta$ is a ratio of bit period to sample period, erf(.) is an error function, and $K_{BT}$ is a bandwidth-time product (which could equal two). A modulation index h can be defined as $h=2 \cdot \Delta F \cdot T_b$. The GFSK modulated signals can be given by:

$$s[n] = \exp\left[j\frac{\pi \cdot h}{N}\sum_{\mu=\infty}^{n}m[\mu]\right] \quad (46)$$

where:

$$m[n] = \sum_{k=-\infty}^{\infty} p_k g[n-kN] \quad (47)$$

$$p_k \in \pm 1 \quad (48)$$

$$I_k \in 0, 1. \quad (49)$$

The transmitted signals can be expressed as:

$$x(t) = A \cdot Re\{e^{j(2\pi \cdot f_c \cdot t + \varphi_{GFSK}(t))}\} \quad (50)$$
$$= A \cdot \cos(2\pi \cdot f_c \cdot t + \varphi_{GFSK}(t))$$

where $f_c$ is the RF or other carrier frequency, and $\phi_{GFSK}(t)$ denotes the modulated GFSK signal.

FIG. 20B illustrates a transmitter 2050 that includes an NRZ encoder 2052, a Gaussian filter 2054, and a VCO 2056. Here, the transmitter 2050 omits an up-converter, and the VCO 2056 produces the GFSK modulated signals.

Although FIGS. 20A and 20B illustrate two examples of transmitters 2000 and 2050 for use in a wireless node of an industrial control and automation system, various changes may be made to FIGS. 20A and 20B. For example, other transmitters supporting GFSK modulation or other modulation schemes could be used.

Note that a wide variety of other functions could be implemented in an industrial control and automation system. For example, as noted above, an infrastructure node (gateway or other) could concurrently support multiple wireless industrial process control protocols, such as ISM100 or ISA-100, wireless HART, and IEEE 802.15.4. Also, an infrastructure node (gateway or other) could support the use of white space wireless radios, which can sense traffic in a wireless spectrum and identify channels (such as frequency channels) not currently in use. The infrastructure node could then inform other nodes to begin transmitting on those identified channels.

The use of diversity reception and transmit beam formers in infrastructure nodes (or other nodes) also opens industrial control and automation systems up to functionality not typically seen in those systems. For example, an infrastructure node (gateway or other) could support the use of spatial routing using directional beams. As particular examples, the infrastructure node could have access to a map in its memory or other location showing relative or absolute positions of other nodes. The infrastructure node could also determine another node's general location using direction-of-arrival techniques for incoming wireless signals. In any event, when data for a particular node is to be transmitted, the infrastructure node can use beam forming to send narrow transmission beams in the general direction of the intended target node. This can both (i) reduce the number of nodes that receive and process a transmission and (ii) direct a transmission more specifically towards a target node, rather than simply broadcasting in free space. Note that if multiple target nodes for data exist, one or multiple directional beams could be transmitted, or a general broadcast into free space could occur.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A system comprising:
   a wireless sensor configured to measure one or more characteristics associated with an industrial process; and
   a wireless node configured to receive wireless signals containing sensor measurements from the wireless sensor, the wireless node comprising a diversity receiver configured to process the wireless signals from the wireless sensor;
   wherein the diversity receiver comprises multiple channels, each channel comprising:
      a baseband signal generator configured to generate a baseband signal based on the received wireless signals, the baseband signal generator comprising an intermediate frequency-to-baseband converter configured to convert an intermediate frequency signal into the baseband signal;
      at least one offset corrector configured to receive the baseband signal and to correct frequency and phase offsets of the baseband signal to generate a corrected baseband signal; and
      a channel estimator configured to estimate channel coefficients using the corrected baseband signal;
   wherein the diversity receiver further comprises:
      a combiner configured to combine multiple outputs from the channels using the channel coefficients to generate a combined baseband signal;
      a demodulator configured to demodulate the combined baseband signal; and
      a time synchronizer configured to decimate the demodulated baseband signal;
   wherein the intermediate frequency-to-baseband converter in each channel is configured to store samples of its intermediate frequency signal in a first buffer, store products of the samples and cosine values in a second buffer, store products of the samples and sine values in a third buffer, store filtered products from the second buffer in a fourth buffer, and store filtered products from the third buffer in a fifth buffer;
   wherein the demodulator comprises (i) a limiter configured to store normalized complex values generated using the filtered products from the fourth and fifth buffers in a sixth buffer and (ii) a discriminator configured to store values generated using products of the normalized complex values and their delayed complex conjugates in a seventh buffer; and
   wherein the time synchronizer is configured to square the values from the seventh buffer, store the squared values in an eighth buffer, sum all same-indexed squared values from the eighth buffer to generate multiple sums that are stored in a ninth buffer, identify an index of a largest sum in the ninth buffer, and store samples of the demodulated baseband signal having the identified index in a tenth buffer.

2. The system of claim 1, wherein the diversity receiver further comprises:
   a threshold adjuster configured to adjust a threshold for distinguishing data values;
   a data detector configured to extract the data values from the decimated baseband signal using the threshold; and
   a frame synchronizer configured to detect a preamble in the data values and to extract payload data from the data values.

3. The system of claim 1, wherein the baseband signal generator in each channel comprises a digital mixer coupled to a matched filter.

4. The system of claim 1, wherein the wireless node is further configured to monitor a wireless spectrum and to select an unused wireless channel for communication with the wireless sensor.

5. The system of claim 1, wherein a controller is configured to process data received using multiple wireless industrial process control protocols and to initiate transmission of data using the multiple wireless industrial process control protocols in different time slots.

6. The system of claim 5, wherein the system further comprises at least one actuator configured to receive control signals from the controller.

7. The system of claim 1, wherein:
   the wireless node is further configured to perform beamshaping in order to transmit a directional beam to at least one other wireless node; and
   the wireless node further comprises a controller configured to perform spatial routing by identifying a target of a wireless transmission and initiating generation of the directional beam towards a known or estimated location associated with the identified target.

8. An apparatus comprising:
   a transceiver configured to transmit wireless signals to and receive wireless signals from one or more wireless nodes associated with an industrial process; and
   a controller configured to initiate transmission of the wireless signals and to process data contained in the received wireless signals;
   wherein the transceiver comprises a diversity receiver configured to process the wireless signals from the one or more wireless nodes;

wherein the diversity receiver comprises multiple channels, each channel comprising:
- a baseband signal generator configured to generate a baseband signal based on the received wireless signals, the baseband signal generator comprising an intermediate frequency-to-baseband converter configured to convert an intermediate frequency signal into the baseband signal;
- at least one offset corrector configured to receive the baseband signal and to correct frequency and phase offsets of the baseband signal to generate a corrected baseband signal; and
- a channel estimator configured to estimate channel coefficients using the corrected baseband signal;

wherein the diversity receiver further comprises:
- a combiner configured to combine multiple outputs from the channels using the channel coefficients to generate a combined baseband signal;
- a demodulator configured to demodulate the combined baseband signal; and
- a time synchronizer configured to decimate the demodulated baseband signal;

wherein the intermediate frequency-to-baseband converter in each channel is configured to store samples of its intermediate frequency signal in a first buffer, store products of the samples and cosine values in a second buffer, store products of the samples and sine values in a third buffer, store filtered products from the second buffer in a fourth buffer, and store filtered products from the third buffer in a fifth buffer;

wherein the demodulator comprises (i) a limiter configured to store normalized complex values generated using the filtered products from the fourth and fifth buffers in a sixth buffer and (ii) a discriminator configured to store values generated using products of the normalized complex values and their delayed complex conjugates in a seventh buffer; and wherein the time synchronizer is configured to square the values from the seventh buffer, store the squared values in an eighth buffer, sum all same-indexed squared values from the eighth buffer to generate multiple sums that are stored in a ninth buffer, identify an index of a largest sum in the ninth buffer, and store samples of the demodulated baseband signal having the identified index in a tenth buffer.

9. The apparatus of claim 8, wherein the baseband signal generator in each channel comprises a digital mixer coupled to a matched filter.

10. The apparatus of claim 8, wherein the controller is further configured to process data received using multiple wireless industrial process control protocols and to initiate transmission of data using the multiple wireless industrial process control protocols in different time slots.

11. The apparatus of claim 8, wherein the controller is further configured to transmit wireless control signals to at least one actuator.

12. The apparatus of claim 8, wherein:
the transceiver is further configured to perform beam-shaping in order to transmit a directional beam; and
the controller is configured to perform spatial routing by identifying a target of a wireless transmission and initiating generation of the directional beam towards a known or estimated location associated with the identified target.

13. A method comprising:
receiving a wireless signal from a wireless sensor associated with an industrial process; and
processing the wireless signal using diversity combining to extract a sensor measurement from the wireless signal;
wherein processing the wireless signal comprises:
- in each of multiple channels, (i) generating a baseband signal using an intermediate frequency-to-baseband converter that converts an intermediate frequency signal into the baseband signal based on the received wireless signal, (ii) correcting frequency and phase offsets in the generated baseband signal to generate a corrected baseband signal, and (iii) estimating channel coefficients using the corrected baseband signal; and
- combining multiple outputs from the channels using the channel coefficients to generate a combined baseband signal, demodulating the combined baseband signal using a demodulator, and decimating the demodulated baseband signal using a time synchronizer;

wherein the intermediate frequency-to-baseband converter in each channel stores samples of its intermediate frequency signal in a first buffer, stores products of the samples and cosine values in a second buffer, stores products of the samples and sine values in a third buffer, stores filtered products from the second buffer in a fourth buffer, and stores filtered products from the third buffer in a fifth buffer;

wherein the demodulator comprises (i) a limiter that stores normalized complex values generated using the filtered products from the fourth and fifth buffers in a sixth buffer and (ii) a discriminator that stores values generated using products of the normalized complex values and their delayed complex conjugates in a seventh buffer; and wherein the time synchronizer squares the values from the seventh buffer, stores the squared values in an eighth buffer, sums all same-indexed squared values from the eighth buffer to generate multiple sums that are stored in a ninth buffer, identifies an index of a largest sum in the ninth buffer, and stores samples of the demodulated baseband signal having the identified index in a tenth buffer.

14. The method of claim 13, wherein processing the wireless signal comprises:
storing samples associated with the wireless signal in a ping-pong buffer system having multiple buffers;
when one of the buffers is full, attempting to detect a preamble of a data frame using the samples in the full buffer; and
if the preamble is detected, partitioning samples associated with the preamble from samples associated with data following the preamble in the data frame.

15. The method of claim 13, wherein processing the wireless signal comprises:
receiving samples associated with the wireless signal;
identifying a time instant based on a transition period in a signal level identified by the samples; and
extracting bit values from the samples using the identified time instant;
wherein identifying the transition period comprises searching for a transition beginning at a last of the received samples if a synchronization word has not yet been detected and beginning at a first of the received samples if the synchronization word has been detected.

16. The method of claim 15, wherein extracting the bit values comprises:
if the time instant for the received samples is greater than a time instant for prior samples by a first specified amount, extracting a bit using the time instant for the prior samples and extracting remaining bits using the time instant for the received samples; and if the time instant for the prior samples is greater than the time instant for the received samples by a second specified amount, discarding a first bit and extracting remaining bits using the time instant for the received samples.

17. The method of claim 13, wherein processing the wireless signal comprises:
whenever a new sample associated with the wireless signal is received, incrementing a counter and determining a sign of a sum of a set of multiple samples;
resetting the counter when the sign of the sum of the samples changes; and
when the counter reaches a maximum value defined by a sampling factor, latching a current sample to an output and asserting an output clock.

18. The method of claim 13, further comprising:
transmitting wireless control signals to at least one actuator.

19. The method of claim 13, further comprising:
transmitting a directional beam; and
performing spatial routing by identifying a target of a wireless transmission and initiating generation of the directional beam towards a known or estimated location associated with the identified target.

20. An apparatus comprising:
a wireless node configured to receive wireless signals containing sensor measurements from a wireless sensor associated with an industrial process, the wireless node comprising a diversity receiver configured to process the wireless signals from the wireless sensor;
wherein the diversity receiver comprises multiple channels, each channel comprising:
an intermediate frequency-to-baseband converter configured to convert an intermediate frequency signal into a baseband signal;
at least one offset corrector configured to correct frequency and phase offsets of the baseband signal to generate a corrected baseband signal; and
a channel estimator configured to estimate channel coefficients using the corrected baseband signal;
wherein the diversity receiver further comprises:
a combiner configured to combine multiple corrected baseband signals from the multiple channels using the channel coefficients to generate a combined baseband signal;
a demodulator configured to demodulate the combined baseband signal;
a time synchronizer configured to decimate the demodulated baseband signal;
a threshold adjuster configured to adjust a threshold for distinguishing data values;
a data detector configured to extract the data values from the decimated baseband signal using the threshold; and
a frame synchronizer configured to detect a preamble in the data values and to extract payload data from the data values;
wherein the intermediate frequency-to-baseband converter in each channel is configured to store samples of its intermediate frequency signal in a first buffer, store products of the samples and cosine values in a second buffer, store products of the samples and sine values in a third buffer, store filtered products from the second buffer in a fourth buffer, and store filtered products from the third buffer in a fifth buffer;
wherein the demodulator comprises (i) a limiter configured to store normalized complex values generated using the filtered products from the fourth and fifth buffers in a sixth buffer and (ii) a discriminator configured to store values generated using products of the normalized complex values and their delayed complex conjugates in a seventh buffer; and
wherein the time synchronizer is configured to square the values from the seventh buffer, store the squared values in an eighth buffer, sum all same-indexed squared values from the eighth buffer to generate multiple sums that are stored in a ninth buffer, identify an index of a largest sum in the ninth buffer, and store samples of the demodulated baseband signal having the identified index in a tenth buffer.

* * * * *